(12) United States Patent
Sakurai et al.

(10) Patent No.: US 7,455,443 B2
(45) Date of Patent: Nov. 25, 2008

(54) SURFACE LIGHT SOURCE DEVICE

(75) Inventors: Kenji Sakurai, Kyoto (JP); Makoto Ohhira, Shiga (JP); Gouo Kurata, Nara (JP); Yasuhiro Kawabata, Nara (JP); Masayuki Shinohara, Kyoto (JP)

(73) Assignee: OMRON Corporation, Kyoto (JP)

( * ) Notice: Subject to any disclaimer, the term of this patent is extended or adjusted under 35 U.S.C. 154(b) by 3 days.

(21) Appl. No.: 11/491,517

(22) Filed: Jul. 21, 2006

(65) Prior Publication Data

US 2007/0019435 A1 Jan. 25, 2007

(30) Foreign Application Priority Data

Jul. 21, 2005 (JP) ............................. 2005-210718

(51) Int. Cl.
*F21V 7/04* (2006.01)
(52) U.S. Cl. ...................................... 362/626; 362/623
(58) Field of Classification Search ................. 362/625, 362/626, 328, 333, 336, 339, 355, 600, 612, 362/613, 620, 623, 628, 561, 559; 349/65; 385/901
See application file for complete search history.

(56) References Cited

U.S. PATENT DOCUMENTS

| | | | | |
|---|---|---|---|---|
| 5,584,556 A | * | 12/1996 | Yokoyama et al. | 362/625 |
| 6,068,382 A | * | 5/2000 | Fukui et al. | 362/625 |
| 7,121,709 B2 | * | 10/2006 | Shinohara et al. | 362/606 |
| 2005/0117370 A1 | * | 6/2005 | Kawashima et al. | 362/615 |

FOREIGN PATENT DOCUMENTS

| | | |
|---|---|---|
| JP | 3-151830 | 6/1991 |
| JP | 2004-045263 | 2/2004 |
| WO | WO-2005/045313 A1 | 5/2005 |

OTHER PUBLICATIONS

Extended European Search Report for European Application No. 06117686.3-2205 dated Nov. 24, 2006 (14 pages).
English machine translation from www4.ipdl.inpit.go.jp for Japanese Patent Gazette No. 3151830, Publication Date: Jun. 28, 1991, 60 pages.
English machine translation from www4.ipdl.inpit.go.jp, for Japanese Patent Application No. 2004-045263, Publication Date: Dec. 2, 2004, 15 pages.
Patent Abstracts of Japan for Japanese Patent Gazette No. 3151830, Publication Date : Jun. 28, 1991, 1 page.
Patent Abstracts of Japan for Japanese Patent Application No. 2004-045263, Publication Date: Dec. 2, 2004, 2 pages.

* cited by examiner

*Primary Examiner*—Hargobind S Sawhney
(74) *Attorney, Agent, or Firm*—Osha·Liang LLP

(57) ABSTRACT

A surface light source device capable of suppressing generation of bright line and preventing generation of crush of pattern forming on a light guide plate even when pressure is applied, includes a plurality of deflection patterns and diffusion patterns wherein the diffusion pattern is formed on the light source side of the deflection pattern. Further, the diffusion pattern is provided so as not to protrude outwards from the light guide plate from the plane opposite to the light-emitting plane and the diffusion pattern diffuses the light incident from a light guide direction to a direction different from the light guide direction seen from a direction perpendicular to the light emitting plane.

15 Claims, 34 Drawing Sheets

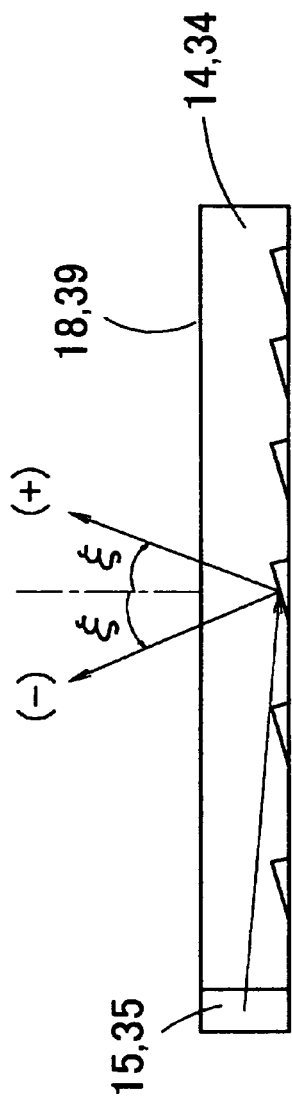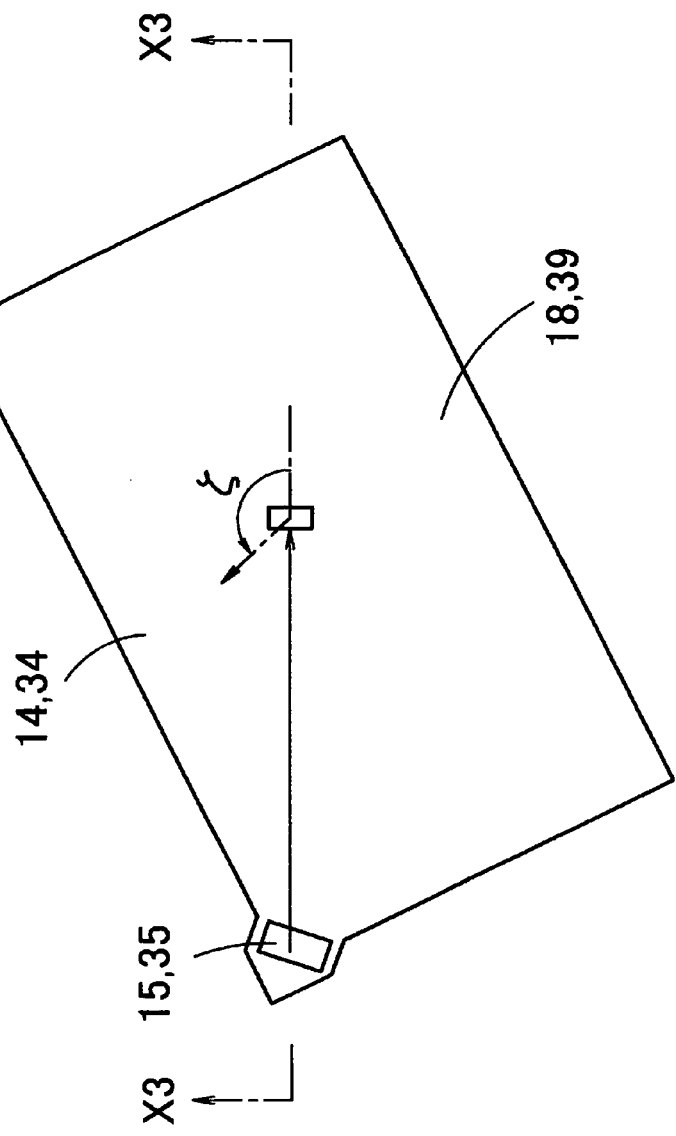
Fig. 16B
Fig. 16A

SURFACE LIGHT SOURCE DEVICE

BACKGROUND OF THE RELATED ART

1. Field of the Invention

The present invention relates to a surface light source device and, more particularly, to a surface light source device used as a back light, a front light, and a reversible light, for use in a liquid crystal display.

2. Description of the Related Art (Prior Art 1)

FIG. 1A shows a schematic sectional view of a structure of a conventional liquid crystal display (see Japanese Patent Gazette No. 3151830) and FIG. 1B shows an enlarged view of a part of FIG. 1A. FIG. 2 shows a schematic perspective view of a back light used in the aforementioned liquid crystal display.

A liquid crystal display 11 is constituted by overlapping a liquid crystal panel 13 on the surface side of a back light 12. The back light 12 is one in which a small light source 15 is arranged at a corner portion of a light guide plate 14 and a reflecting plate 16 is arranged facing the backside of the light guide plate 14. Deflection patterns 17, each having a short triangle prism shape arrayed in concentric arcs with a central focus on the position placing the light source 15, are arranged on the backside of the light guide plate 14.

Therefore, when the light source 15 is emitted, light of the light source 15 incident from a light incident surface of the light guide plate 14 to the inside of the light guide plate 14 is radially propagated in the light guide plate 14 while total reflection is repeated between the surface (light emitting plane 18) of the light guide plate 14 and the backside. Light incident to the deflection pattern 17 on this midstream is performed by total reflection at the deflection pattern 17, as marked by a solid arrow shown in FIG. 1A and FIG. 1B. The light performed by total reflection is outputted substantially vertically from the light emitting plane 18 to outside to illuminate the liquid crystal panel 13 from the backside side.

Such the liquid crystal display 11 has features that electric power consumption is low and brightness is high, because light usability is high. Furthermore, two prism sheets are not required to be disposed between the light emitting plane 18 of the light guide plate 14 and the liquid crystal panel 13 and therefore reduction in thickness and reduction in cost of the liquid crystal display 11 can be achieved.

However, in the liquid crystal display 11 of such a structure, as marked by a dash line shown in FIG. 1B, when the light reflected at a flat portion of the backside of the light guide plate 14 in the vicinity of the deflection pattern 17 is entered to the deflection pattern 17 and total reflection is performed there, the light is outputted in a direction largely inclined from the direction perpendicular to the light emitting plane 18. As shown in FIG. 2, when the back light 12 is seen from an oblique direction, a bright line 19 is generated on the surface of the light guide plate 14 due to the light to degrade image quality of the liquid crystal display 11.

(Prior Art 2)

FIG. 3A shows a schematic sectional view of a structure of another conventional liquid crystal display and FIG. 3B shows an enlarged view of a part of FIG. 3A. In order to solve the aforementioned problem, in a liquid crystal display 21 disclosed in Japanese Patent Application No. 2004-045263, a projection 22 having a triangle prism shape is projected on the backside of a light guide plate 14 on the light source side of a deflection pattern 17. When such the projection 22 is provided, light incident to the light source side of the deflection pattern 17 is performed by total reflection at the projection 22 to enter to the deflection pattern 17, as marked by a dash line shown in FIG. 3B. As a result, the light reflected at the deflection pattern 17 is outputted toward a direction substantially perpendicular to a light emitting plane 18 of the light guide plate 14 to be effectively used as illuminated light. Consequently, generation of the bright line 19 as shown in FIG. 2 is suppressed, so that image quality of the liquid crystal display 21 is improved and screen brightness is also improved.

However, in the method in which the projection 22 of the triangle prism shape is projected on the backside of the light guide plate 14, there arises a problem in that when pressure is applied from the reflecting plate 16 side of the backside of the light guide plate 14, the projection 22 is crashed due to the pressure. For example, as shown in FIG. 4, when the liquid crystal display 21 is reversed and is pressed by a metallic rod 23 from above the reflecting plate 16, crush of the projection 22 is observed. During assembly or use of the liquid crystal display 21, there is a case that the liquid crystal display 21 is dropped, and in this case, there is a possibility that the projection 22 of the light guide plate 14 is crushed. Consequently, there is a possibility that brightness decreases at the crushed point of the projection 22 and a bright line is generated. In addition, reference numeral 24 shown in FIG. 4 denotes a diffusion plate.

SUMMARY

Embodiments of the present invention provide a surface light source device which is capable of suppressing generation of such aforementioned bright line and is difficult to generate crush of pattern of the backside of a light guide plate even when pressure is applied.

In accordance with one aspect of the present invention, a surface light source device comprises: a light guide plate having a light emitting plane at one end; and a light source arranged at a corner portion or side of the light guide plate, wherein a plurality of deflection patterns is formed on a plane opposite to the light emitting plane; the deflection pattern outputs light from the light emitting plane by reflecting the light guiding in the light guide plate; a diffusion pattern is formed on the light source side of the deflection pattern; the deflection pattern and the diffusion pattern are formed so as not to protrude outwards of the light guide plate from the plane opposite to the light emitting plane; and the diffusion pattern diffuses the light incident from a light guide direction to a direction different from the light guide direction seen from a direction perpendicular to the light emitting plane. In addition, the light guide direction denotes a direction connecting the deflection pattern or any position of the light guide plate and the light source in the shortest distance, seen from a direction perpendicular to the light emitting plane of the light guide plate.

An embodiment of the present invention, a width extending perpendicular to the light guide direction of the diffusion pattern is wider than a width extending perpendicular to the light guide direction of the deflection pattern, when seen from a direction perpendicular to the light emitting plane.

An embodiment of the present invention, the diffusion pattern is formed by at least one convex pattern, concave pattern and corrugated pattern.

An embodiment of the present invention, the diffusion pattern is a sine wave shape in cross section in a plane perpendicular to the light guide direction and has a uniform cross section in the light guide direction.

An embodiment of the present invention, the diffusion pattern is a triangular wave shape in cross section in which an isosceles triangle pattern continues in a plane perpendicular to the light guide direction and has a uniform cross section in the light guide direction.

An embodiment of the present invention, the diffusion pattern is a waveform shape in cross section in a plane perpendicular to the light guide direction and has a uniform cross section in the light guide direction; and a pitch of the waveform in cross section perpendicular to the light guide direction is random.

An embodiment of the present invention, a pitch in cross section in a plane perpendicular to the light guide direction of the diffusion pattern has the minimum value which is not less than 1.5 µm and the maximum value which is not less than twice the minimum value; and the diffusion pattern of each pitch in between the minimum value and the maximum value is provided at substantially the same frequency.

An embodiment of the present invention, an end placed on the light source side of the diffusion pattern is a shape in which a substantially semi cone shaped pattern is disposed along a direction perpendicular to the light guide direction.

An embodiment of the present invention, the diffusion pattern is constituted by a plurality of patterns, each having a hemispheric shape or a semi-elliptical spherical shape.

An embodiment of the present invention, the maximum height Rmax of the diffusion pattern is satisfied as follows: $0.2\ \mu m \leq Rmax \leq 0.5 \times H$, where Rmax is the maximum height of the diffusion pattern measured from the plane opposite to the light emitting plane of the light guide plate; and H is a vertical height of the deflection pattern measured from the plane opposite to the light emitting plane of the light guide plate.

An embodiment of the present invention, a length in the light guide direction of the diffusion pattern is not less than twice the length in the light guide direction of an inclined plane which makes the light at the deflection pattern perform total reflection.

An embodiment of the present invention, a fine corrugated shape is formed along a ridge line placed at the uppermost portion of the deflection pattern.

In addition, the above-described constituent elements and embodiments of the present invention can be arbitrarily combined as much as possible.

BRIEF DESCRIPTION OF THE DRAWINGS

FIGS. 16A and 16B show views for explaining an outgoing angle used in FIG. 15, and FIG. 16B shows a sectional view taken along the line X3-X3 shown in FIG. 16A;

DETAILED DESCRIPTION

Embodiments according to the present invention will be described below in detail with reference to the drawings.

Figure 5:
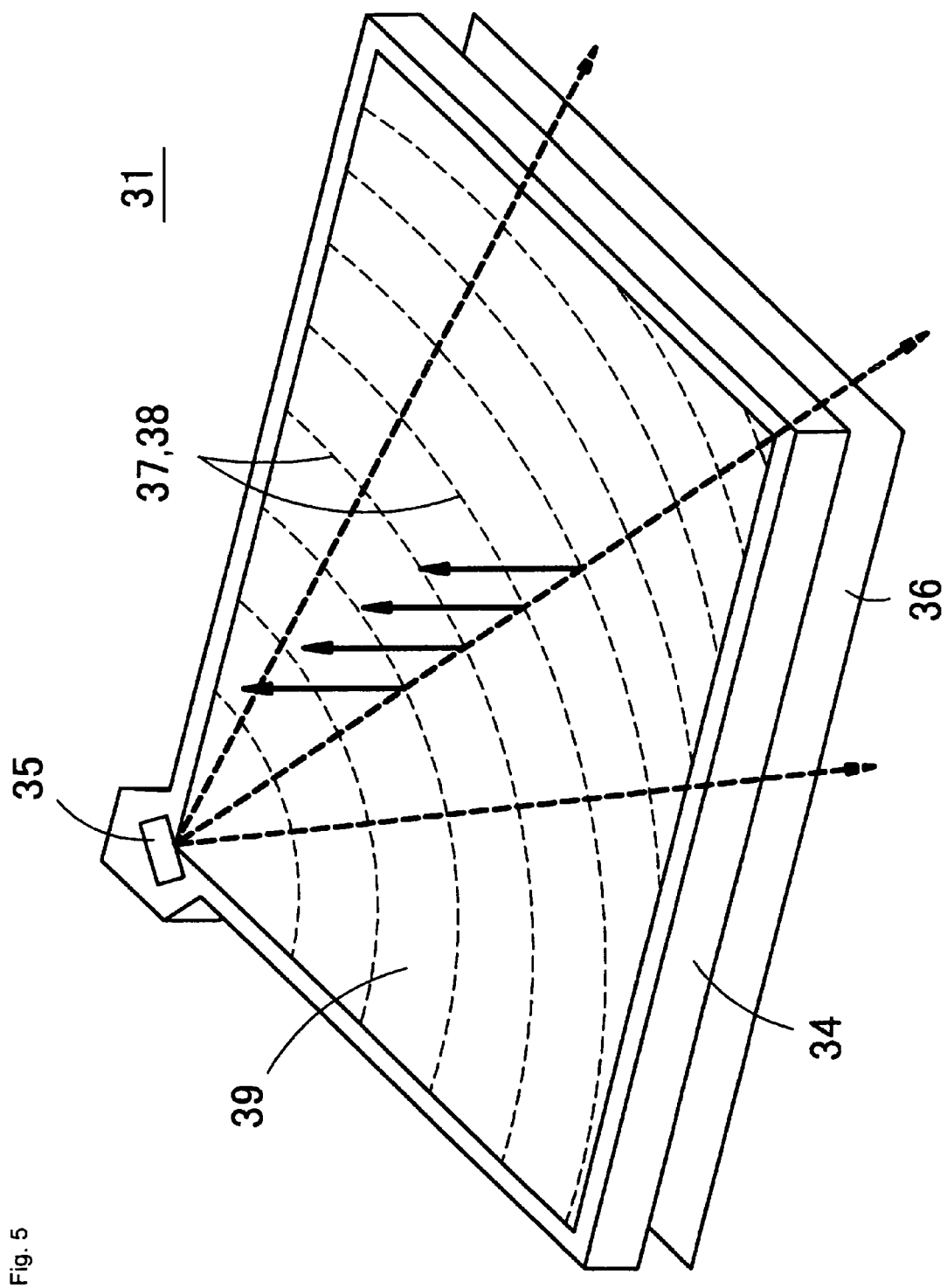
FIG. 5 shows a perspective view of a surface light source device according to a first embodiment of the present invention.

FIG. 5 shows a perspective view of a surface light source device according to a first embodiment of the present invention. As shown in FIG. 5, a surface light source device 31 is one in which a small light source 35 is arranged at a corner portion of a light guide plate 34 made of a transparent resin material and a reflecting plate 36 is arranged facing the backside of the light guide plate 34. The light guide plate 34 is molded by a transparent resin material, such as polycarbonate resin, polymethylmethacrylate, and cyclo olefin polymer (referred to as COP). A number of fine deflection patterns 37 and fine diffusion patterns 38 are formed on the backside of the light guide plate 34 arrayed in concentric circles with a central focus on the position of the light source 35. The deflection patterns 37 and the diffusion patterns 38 are arranged with relatively low density in the vicinity of the light source 35 and arranged with gradually high density with being apart from the light source 35 so that the deflection patterns 37 and the diffusion patterns 38 become substantially uniform in brightness at an effective light emitting region of the surface light source device 31. The light source 35 is one in which a bear chip of LED is sealed within a transparent resin and further coated with a white resin at a region except for a light emitting plane thereof. Furthermore, in the example shown in FIG. 5, the light source 35 is fitted at the corner portion situated in the light guide plate 34; however, the light source 35 may be arranged on an outer peripheral portion of the light guide plate 34. The reflecting plate 36 is formed by a white sheet or a metal sheet. In addition, when it is referred to as merely the backside of the light guide plate 34, it means the backside of the light guide plate 34, that is, a flat plane opposite to a light emitting plane 39.

The light guide plate 34 is molded by an injection molding method. In other words, a molding die is composed of a lower die and an upper die and a molding cavity is formed between the both dies. The lower die includes a mirror surface for molding the light emitting plane 39; and the upper die includes a corrugated transcription pattern for molding the deflection pattern 37 and the diffusion pattern 38. Then, melted resin material is injected in the cavity of the molding dies to fill, the resin material is cooled to harden, and then the molding dies are opened to take out the molded light guide plate.

Figure 6:
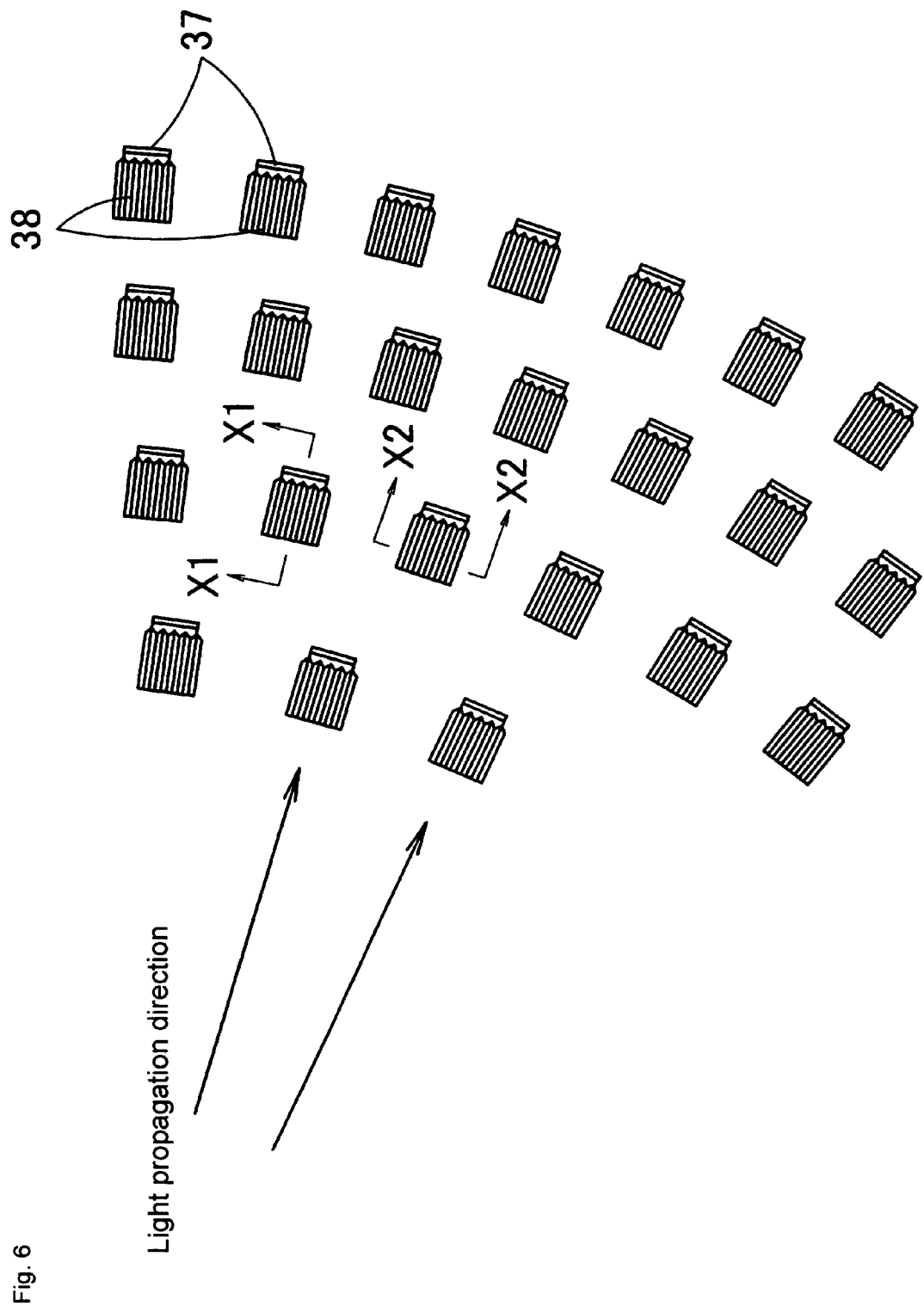
FIG. 6 shows a schematic plan view of a state where portions of deflection patterns and diffusion patterns are seen from the surface of a light guide plate.
Figure 7:
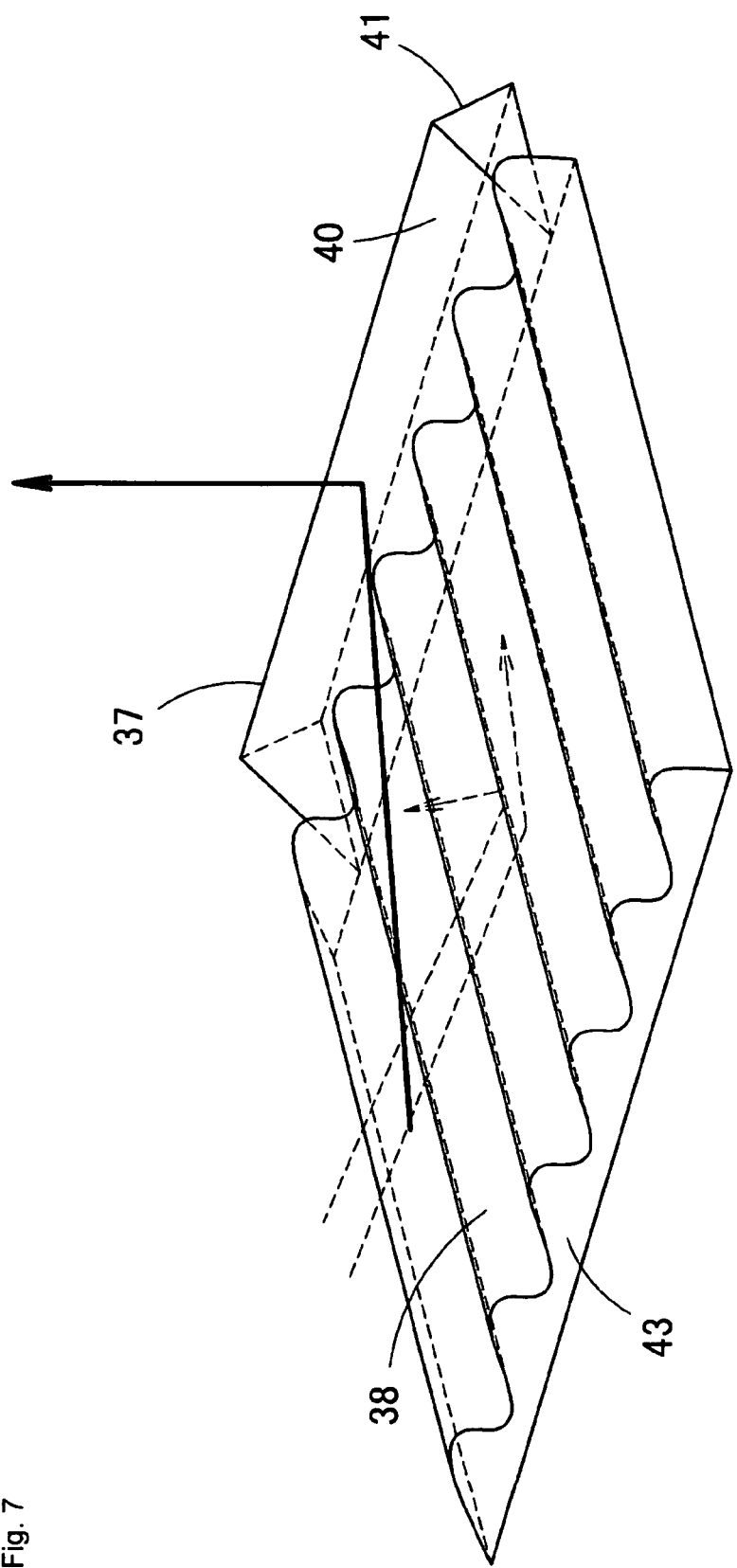
FIG. 7 shows a perspective view in which a pair of the deflection pattern and the diffusion pattern is seen from the side nearer to a light source situated in the light guide plate.
Figure 8:
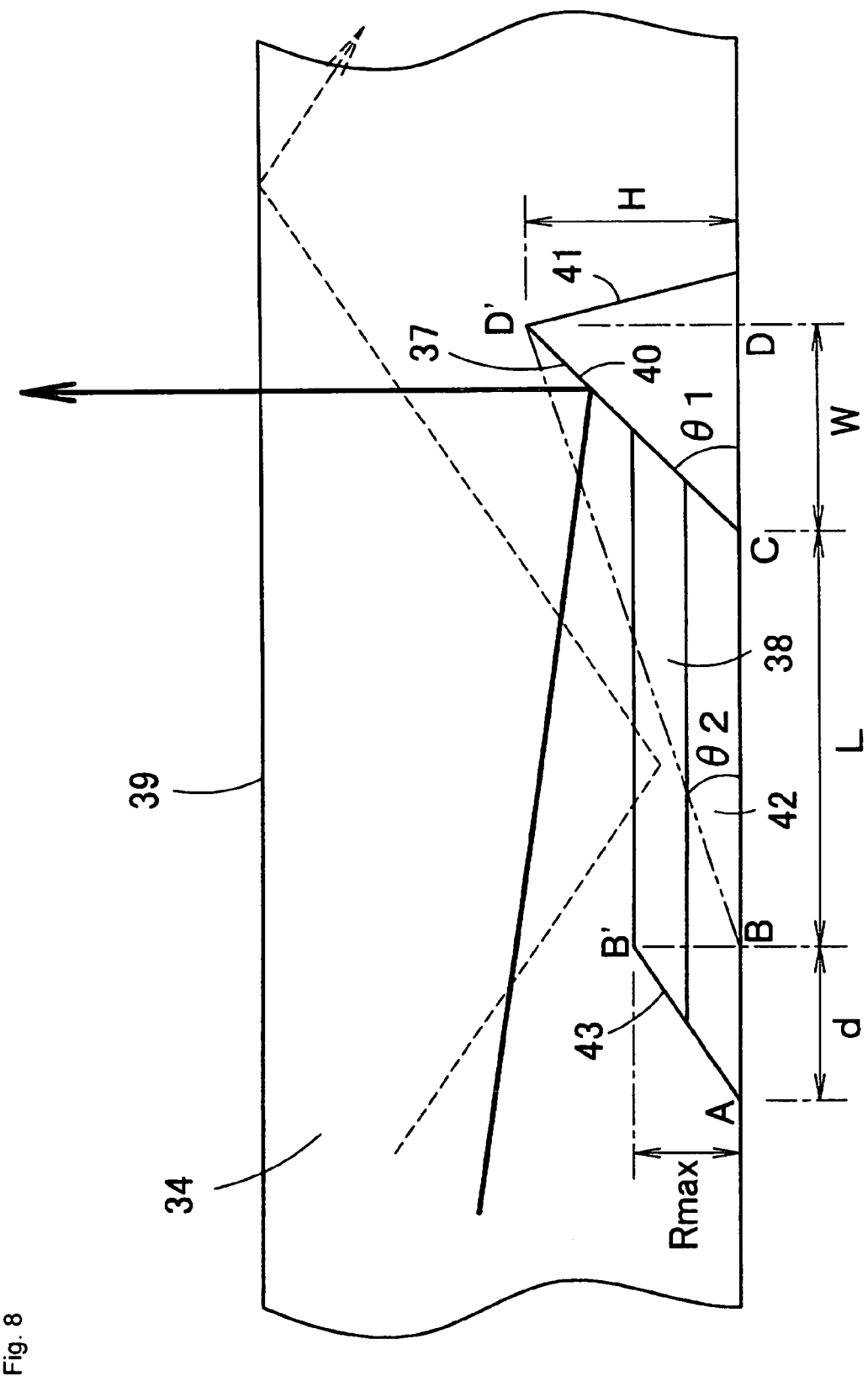
FIG. 8 shows an enlarged sectional view of the deflection pattern and the diffusion pattern taken along the X1-X1 line shown in FIG. 6.
Figure 9:
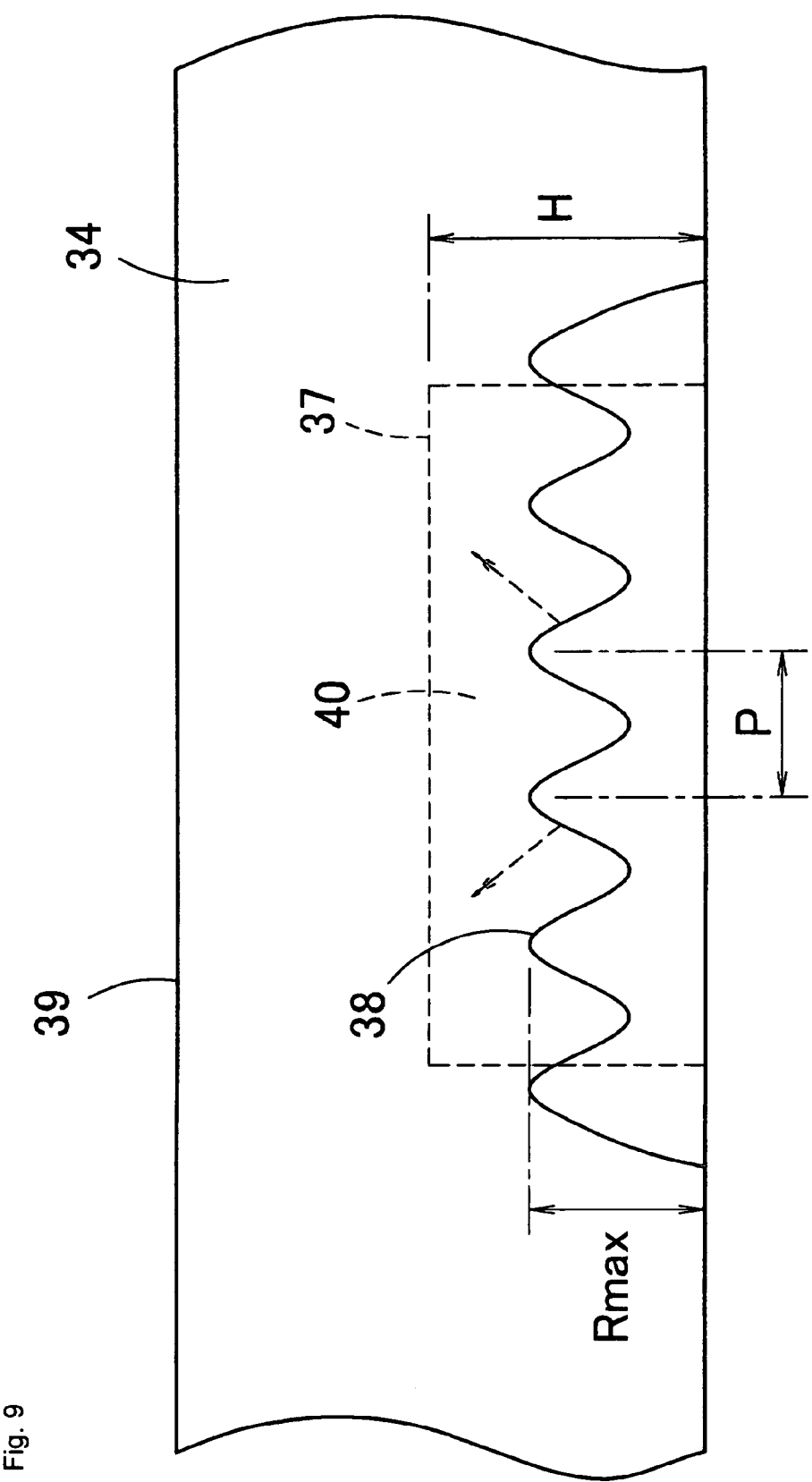
FIG. 9 shows an enlarged sectional view of the deflection pattern and the diffusion pattern taken along the X2-X2 line shown in FIG. 6.

FIG. 6 shows a schematic plan view of a state where portions of the deflection patterns 37 and the diffusion patterns 38 are seen from the surface of the light guide plate 34. FIG. 7 shows a perspective view in which a pair of the deflection pattern 37 and the diffusion pattern 38 is seen from the side nearer to the light source 35 situated in the light guide plate. FIG. 8 shows an enlarged sectional view of the deflection pattern 37 and the diffusion pattern 38 taken along the X1-X1 line shown in FIG. 6. FIG. 9 shows an enlarged sectional view of the deflection pattern 37 and the diffusion pattern 38 taken along the X2-X2 line shown in FIG. 6.

As shown in FIG. 6, the deflection patterns 37 are arranged at spaces each other in concentric circles with a central focus on the position of the light source 35 (alternatively, a virtual light source). In this regard, however, a plurality of deflection patterns 37 is not necessarily required to be placed on one circumference. That is, when seen from a direction perpendicular to the light emitting plane 39 of the light guide plate 34, each of the deflection patterns 37 has its width direction (lengthwise direction) arranged so as to be situated perpendicular to a direction connecting the light source 35 and the aforementioned deflection pattern 37. As shown in FIG. 7 and FIG. 8, the deflection pattern 37 is formed by sinking the backside of the light guide plate 34 so as to be triangle prism shape, thereby having a total reflection plane of light 40 placed nearer to the light source 35 and a re-incident plane 41 placed farther from the light source 35.

The diffusion pattern 38 continues into the deflection pattern 37 and is placed on the side nearer to the light source 35 than the deflection pattern 37. The diffusion pattern 38 is provided in a recess 42 partially sunk on the backside of the light guide plate 34 so as not to protrude from the backside of the light guide plate 34. The diffusion pattern 38 of this embodiment is a corrugated pattern which makes most part of light beam incident from the light source 35 reflect toward a direction different from a light incident direction thereof, seen from a direction perpendicular to the light emitting plane 39. In this embodiment described here, the diffusion pattern 38 is formed in a waveform in cross section and, more particularly, in a form so as to depict in a substantially sine wave, as shown in FIG. 7 and FIG. 9. The diffusion pattern 38 changes its height so as to depict a waveform in a direction perpendicular to a light guide direction (in other words, a direction parallel to a direction connecting the light source 35 and the aforementioned diffusion pattern 38, that is, a direction marked by the dash line shown in FIG. 5) and has uniform cross section shape except for both ends in the light guide direction. One end of the diffusion pattern 38 is continued into the deflection pattern 37. The other end of the diffusion pattern 38 is formed to be an inclined plane 43 having a shape in which a substantially semi cone shaped pattern is disposed along a direction perpendicular to the light guide direction. A width of the diffusion pattern 38 is wider than that of the deflection pattern 37; and both ends of the diffusion pattern 38 protrude outward from ends in the width direction of the deflection pattern 37.

Therefore, in the surface light source device 31, when light is outputted from the light source 35, the light of the light source 35, incident to the inside of the light guide plate 34 goes straight ahead or propagates while repeating total reflection between the surface of the light guide plate 34 and the backside. Then, most of the light is radially propagated with a central focus on substantially the light source 35 when seen from a direction perpendicular to the light emitting plane 39. As marked by a solid arrow shown in FIG. 7 and FIG. 8, the light reached the deflection pattern 37 by propagating within the light guide plate 34 is performed by total reflection at the total reflection plane of light 40 and then outputted toward a substantially vertical direction from the light emitting plane 39. Therefore, an object such as a liquid crystal panel arranged in front of the surface light source device 31 can be vertically illuminated from the backside, whereby a prism sheet, which is provided for aligning the light direction vertically, does not need to be disposed between the surface light source device 31 and the object.

Furthermore, the light reached the diffusion pattern 38 is diffused to the right and the left depending on the diffusion pattern 38, as marked by dash lines shown in FIGS. 7, 8 and 9. Consequently, the light reflected at the diffusion pattern 38 or the light reflected at the diffusion pattern 38 and further reflected at the total reflection plane of light 40 is emitted toward a direction out of the direction of the bright line 19 shown in FIG. 2 and the outgoing direction is not also uniformed. Therefore, the surface light source device 31 can also suppress generation of the bright line 19 which has been a problem in the prior art 1 (the surface light source device of Japanese Patent Gazette No. 3151830). Furthermore, there is not a possibility that front face brightness of the surface light source device 31 lowers as compared with the prior art 1.

Furthermore, the diffusion pattern 38 is provided within the recess 42 of the backside of the light guide plate 34 so as not protrude from the backside of the light guide plate 34 and therefore there is not a possibility of damage due to pressure or shock from outside as in the projection 22 of the prior art 2 (the surface light source device of JP-A 2004-045263).

In addition, the reflecting plate 36 functions to reenter light leaked from the backside of the light guide plate 34 into the light guide plate 34. The re-incident plane 41 functions to catch light leaked from the total reflection plane of light 40 and reenter it into the light guide plate 34. Then, the reflecting plate 36 and the re-incident plane 41 make light usability of the surface light source device 31 improve.

Next, a design example for the deflection pattern 37 and the diffusion pattern 38 in the first embodiment will be described with reference to FIG. 8 and FIG. 9. A tilt angle $\theta 1$ of the total reflection plane 40 ranges from 31° to 57° in order to improve light emitting efficiency from the light emitting plane 39.

Figure 10:
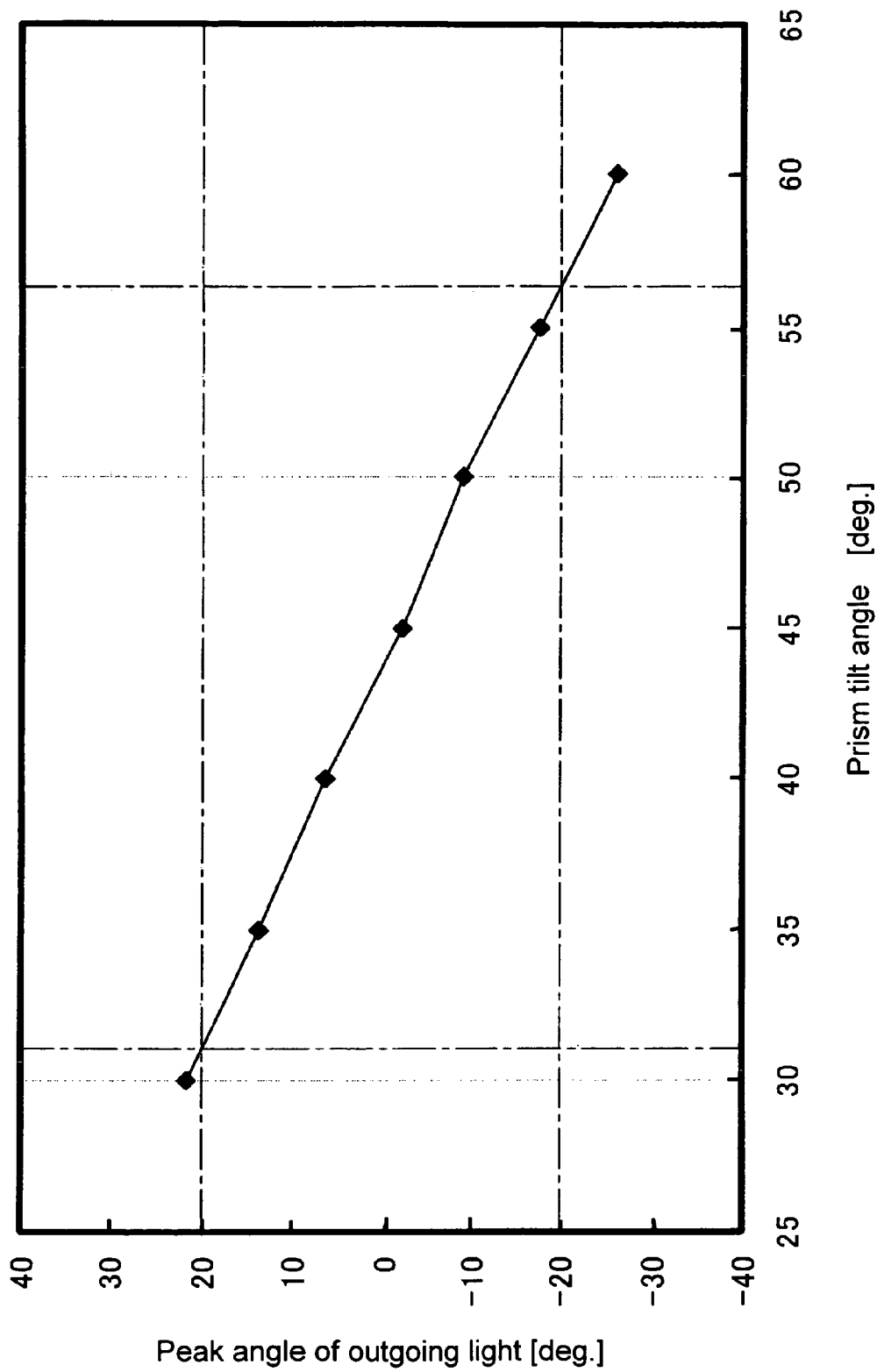
FIG. 10 shows a view of a relationship between a tilt angle θ1 (prism tilt angle) of a total reflection plane and a peak angle at which brightness of light outputted from a light emitting plane becomes the maximum.

FIG. 10 shows a view of a relationship between a tilt angle $\theta 1$ (prism tilt angle) of the total reflection plane of light 40 and a peak angle at which brightness of light outputted from the light emitting plane 39 becomes the maximum. A horizontal axis of FIG. 10 shows the tilt angle $\theta 1$ of the total reflection plane of light 40 and a vertical axis shows the peak angle at which the brightness of the light outputted from the light emitting plane 39 becomes the maximum. The peak angle denotes an angle measured from a direction including the light guide direction and perpendicular to the light emitting plane 39 in the plane surface perpendicular to the light emitting plane 39. The peak angle on the farther side from the light source 35 is shown by a plus value and the peak angle on the nearer to the light source 35 is shown by a plus value. In general, when considering the characteristics of the surface light source device, in the case of taking into account of usage for a liquid crystal display, etc, one can obtain good brightness at ranges from −20° to +20° when measured from the direction perpendicular to the light emitting plane 39. To that end, the peak angle of the light outputted from the light emitting plane 39 may be set at ranges from −20° to +20°. According to FIG. 10, in order to keep the peak angle of outgoing light within the range from −20° to +20°, it turns out that the tilt angle $\theta 1$ of the total reflection plane of light 40 may be set at ranges from 31° to 57°. Consequently, if the tilt angle $\theta 1$ of the total reflection plane of light 40 is set at ranges from 31° to 57°, the peak angle (angle made in a direction perpendicular to the light emitting plane 39) of the outgoing light of the surface light source device 31 becomes at ranges from −20° to +20°, thereby obtaining good brightness.

Furthermore, in one or more embodiments, the re-incident plane 41 is kept substantially vertical (tilt angle 90°); however, the re-incident plane 41 is appropriately inclined from the vertical plane in order to facilitate rapping in molding.

Now, in the cross section shown in FIG. 8, an end of a ridge line of the diffusion pattern 38 is set as a point B'; and an intersection of a vertical line vertically down from the point B' to the backside of the light guide plate 34 and the backside of the light guide plate is set as a point B. The light which becomes the bright line 19 in the prior art 1 appears when a light incident to the backside of the light guide plate 34 with being at not less than 20° to the backside of the light guide plate, is performed by total reflection at the backside of the light guide plate and the total reflection plane of light 40. Consequently, in order to suppress generation of the bright line, as marked by the dash line shown in FIG. 8, it may be configured so that light (zero-order reflecting light in the case when the diffusion pattern 38 is considered as a diffraction grating) performed by total reflection at the diffusion pattern 38 is not entered to the total reflection plane of light 40. To that end, when an angle made by the point B and a line segment BD' connecting the point B and an apex D' of the deflection pattern 37 is set as $\theta 2$, the angle $\theta 2$ may be not more than 20°.

When an intersection of a vertical line vertically down from the apex D' of the deflection pattern 37 to the backside of the light guide plate 34 and the backside of the light guide plate is set as a point D, a projected length W to the backside of the light guide plate of the total reflection plane of light 40 is shown by distance between the point D and a lower end point C of the total reflection plane of light 40. A vertical height H of the deflection pattern 37 is expressed by the following equation 1 using the projected length W and the tilt angle $\theta 1$ of the total reflection plane of light 40.

$$H = W \cdot \tan \theta 1 \quad \text{(equation 1)}$$

Furthermore, when distance between the lower end point C of the total reflection plane of light 40 and the point B (referred to as a length of the diffusion pattern 38 below) is set as L, the following equation 2 can be obtained.

$$H = (W+L) \cdot \tan \theta 2 \quad \text{(equation 2)}$$

Consequently, condition that $\theta 2$ is not less than 20° can be obtained by the following equation 3 from the aforementioned equation 1 and equation 2.

$$L > W \times [(\tan \theta 1 / \tan 20°) - 1] \quad \text{(equation 3)}$$

From the standpoint of that when the angle $\theta 1$ of the total reflection plane of light 40 is 45°, the vertical height H of the deflection pattern 37 is equal to the projected length W of the total reflection plane of light 40. Then the following equation can be obtained from the aforementioned equation 3.

$$L > 1.75 \times W$$

Consequently, the length L of the diffusion pattern 38 can be more than about twice the projected length W of the total reflection plane of light 40 if some amount of margin is provided. Since the projected length W of the total reflection plane of light 40 is usually approximately 5 µm, the vertical height H of the deflection pattern 37 is also approximately 5 µm and therefore the length L of the diffusion pattern 38 may be not less than about 10 µm.

This can be expressed that when the width of the deflection pattern 37 is almost equal to the width of the diffusion pattern 38, a project area to the backside of the light guide plate of the diffusion pattern 38 may be not less than about twice the project area to the backside of the light guide plate of the total reflection plane of light 40. Furthermore, if area of the diffusion pattern 38 is excess, light diffusion becomes large and therefore in several embodiments the width of the diffusion pattern 38 is smaller than "W+Pmax".

Consequently, in the surface light source device 31, the length L of the diffusion pattern 38 is not less than about twice the projected length W of the total reflection plane of light 40 and therefore light incident to the diffusion pattern 38 at an angle of more than 20° is reflected at the total reflection plane of light 40, thereby preventing the light from becoming a bright line to suppress generation of the bright line.

Furthermore, as shown in FIG. 8 and FIG. 9, when the maximum height of the diffusion pattern 38 measured from a flat portion of the backside of the light guide plate 34 is set as Rmax, in several embodiments the maximum height of the diffusion pattern 38 is set to Rmax of the following equation 4.

$$0.2\ \mu m \leq Rmax \leq 0.5 \times H \qquad \text{(equation 4)}$$

Figure 11:
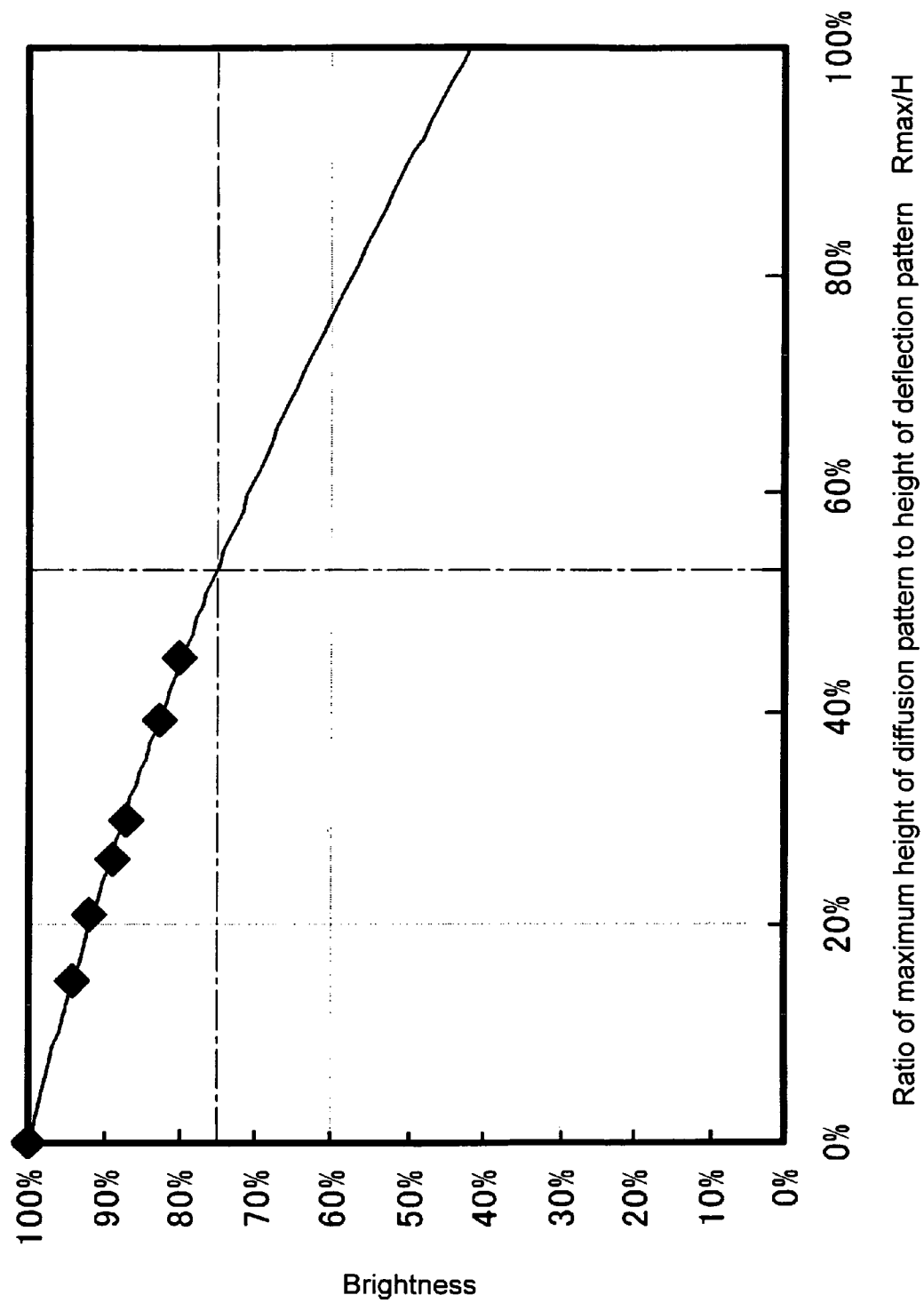
FIG. 11 shows a view of a result in which change of brightness of the surface light source device is examined by changing the maximum height Rmax of the diffusion pattern.

The reason will be described. FIG. 11 shows a view of a result in which change of brightness of the surface light source device 31 is examined by changing the maximum height Rmax of the diffusion pattern 38. A horizontal axis of FIG. 11 shows a ratio of the maximum height Rmax of the diffusion pattern 38 with respect to the vertical height H of the deflection pattern 37 and a vertical axis shows brightness ratio of the surface light source device 31. However, brightness ratio makes brightness when the diffusion pattern 38 is not provided set as 100%. Decreasing rate of the permissible brightness is approximately 25% when the diffusion pattern 38 is not provided; and it turns out that this is Rmax/H≦0.5 according to FIG. 11. Consequently, this may be set as Rmax≦0.5H.

Meanwhile, when refraction index of the light guide plate 34 is set as about 1.5, an angle made by a light line direction of the light guiding in the light guide plate 34 with respect to the backside of the light guide plate 34 is within ranges from −40° to +40°. The diffusion pattern 38 functions as a reflective diffraction grating and therefore if the diffusion pattern 38 having a size in which light of such the angle region does not diffract at the diffusion pattern 38 is made, zero order light (specular reflection light) of the light reflected at the diffusion pattern 38 increases to cause generation of the bright line. In view of the light in which wavelength propagating at the angle from 40° to +40° to the backside of the light guide plate is not higher than 400 nm, the maximum height Rmax of the diffusion pattern needs not less than 0.2 μm in order that the light diffracts at the diffusion pattern 38. Consequently, a lower limit of the maximum height Rmax of the diffusion pattern 38 is 0.2 μm and the range of the maximum height Rmax of the diffusion pattern 38 becomes the following as described above (equation 4).

$$0.2\ \mu m \leq Rmax \leq 0.5 \times H$$

Furthermore, difference in height of the crests and troughs of the corrugated diffusion pattern 38 is as much as possible approximately equal to Rmax. A tilt angle of the inclined plane 43 is approximately 45° and therefore if a lower point of the inclined plane 43 is set as a point A, a projected length AB=d of the inclined plane 43 to the backside of the light guide plate is almost equal to the height Rmax of the inclined plane 43.

Figure 12:
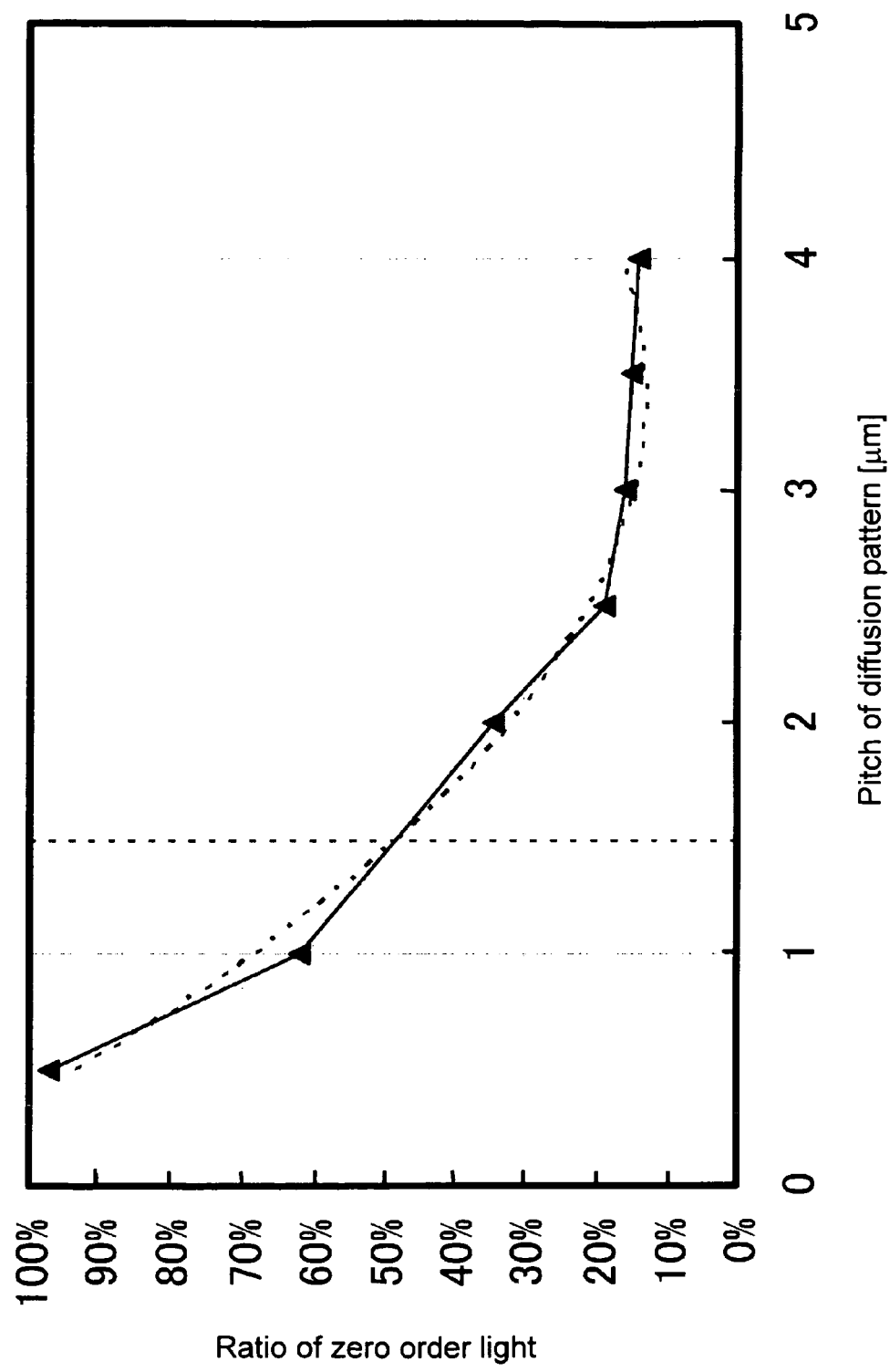
FIG. 12 shows a view of a relationship between pitch P of the diffusion pattern and a ratio of the zero-order light included in light reflected by the diffusion pattern.

Further, pitch (cycle) P of the diffusion pattern 38 shown in FIG. 9 is preferable to be not less than 1.5 μm. The pitch of the diffusion pattern 38 denotes a horizontal distance between adjacent projections (the maximum position) as shown in FIG. 9. Of light reflected at the diffusion pattern 38, a ratio of the zero-order (diffraction) light changes depending on the pitch P of the diffusion pattern 38 as shown in FIG. 12. As will be appreciated from FIG. 12, when the pitch P of the diffusion pattern 38 decreases, the ratio of the zero order light increases accordingly. The number of the bright lines can be decreased if the ratio of the zero order light is set so as to be not more than 50% and therefore it turns out that the pitch P of the diffusion pattern 38 may be not less than 1.5 μm according to FIG. 12.

Figure 13A:
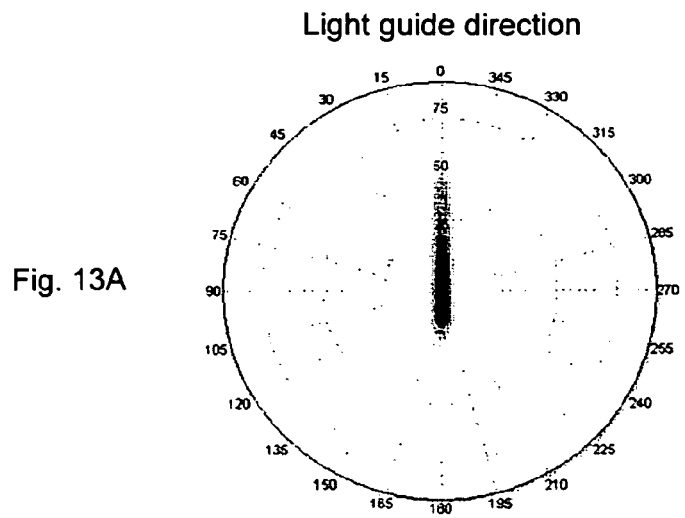
FIG. 13A, FIG. 13B, and FIG. 13C respectively show views of a directional pattern of light outputted from the light emitting plane of the light guide plate in the prior art 1, the prior art 2, and the first embodiment.
Figure 13B:
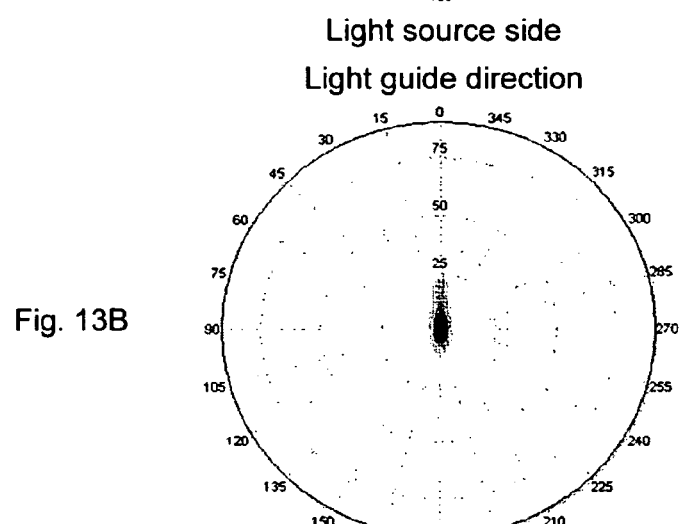
Figure 13C:
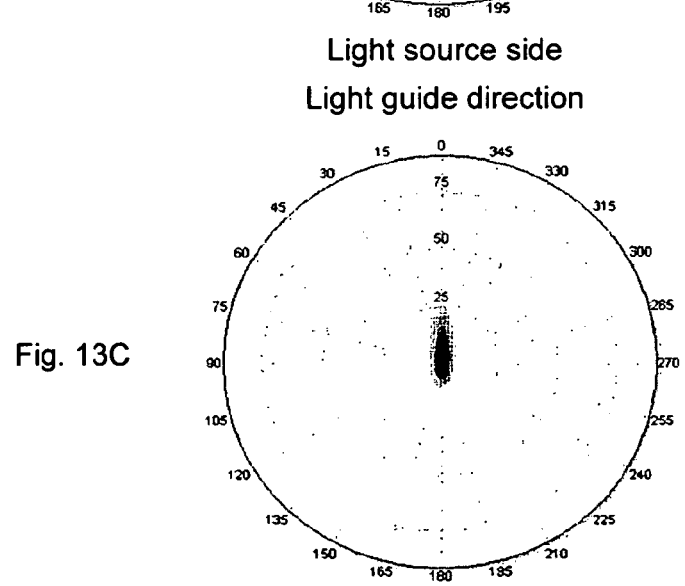

Next, each directional pattern of the surface light source devices according to the prior art 1, the prior art 2, and the first embodiment will be described by comparison. FIG. 13A, FIG. 13B, and FIG. 13C respectively show views of a directional pattern of light outputted from the light emitting plane of the light guide plate in the prior art 1, the prior art 2, and the first embodiment; and a it shows that the deeper the color is, the higher the brightness is. In FIG. 13A, FIG. 13B, and FIG. 13C, the center of each circle denotes a direction perpendicular to the light emitting plane of the light guide plate; distance (radius) from the center denotes an elevation angle ξ measured from a direction perpendicular to the light emitting plane; and circumferential angle denotes an azimuthal angle ζ in which the light guide direction is set as the standard.

Figure 14:
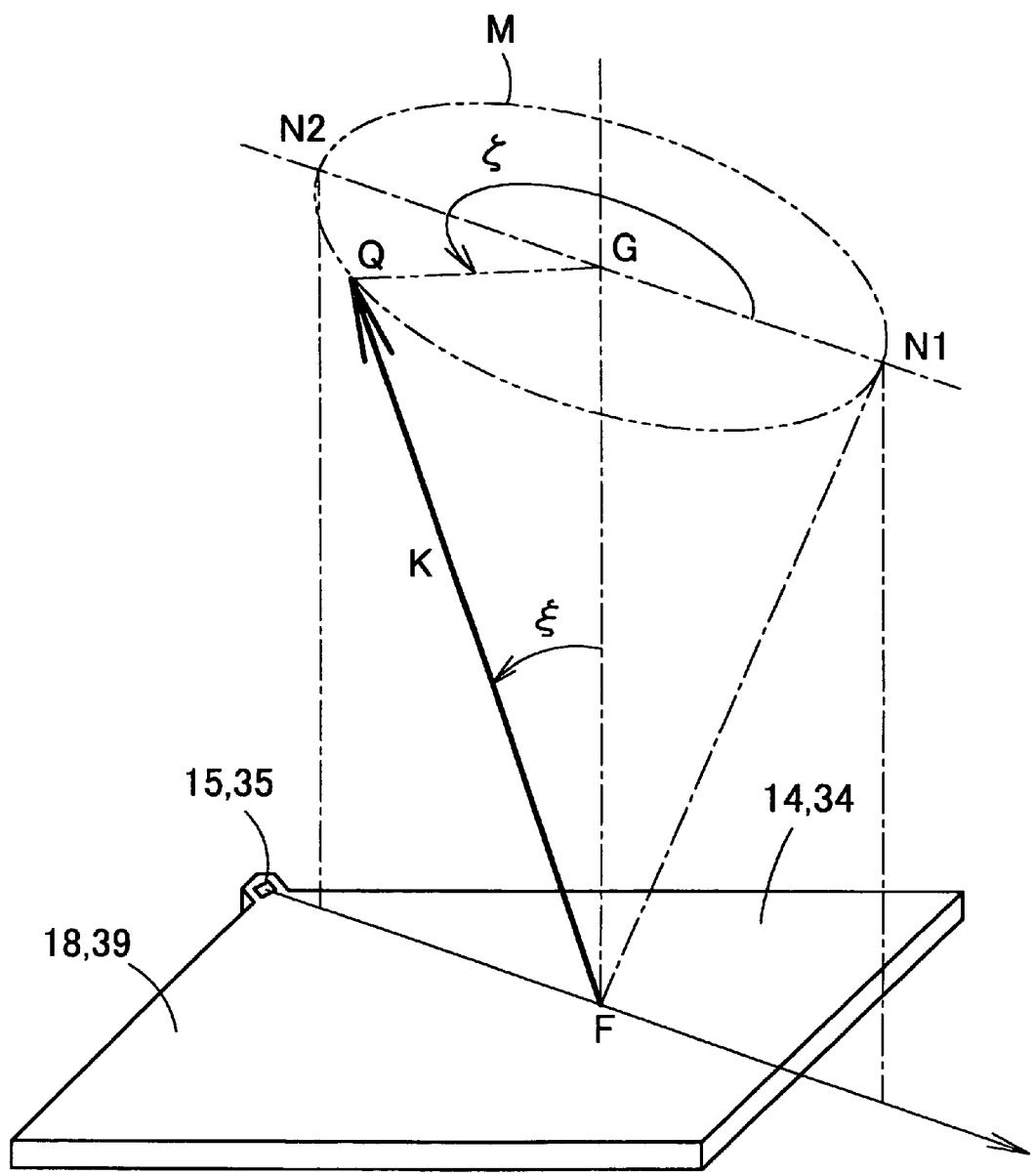
FIG. 14 shows a view for explaining definition of an elevation angle $\xi$ and an azimuthal angle $\zeta$ used in FIG. 13.

FIG. 14 shows a view for explaining definition of the elevation angle ξ and the azimuthal angle ζ used in FIG. 13. A point F denotes an any position in the light emitting plane 18 or 39 of the light guide plate 14 or 34; and a dashed-dotted line FG denotes a vertical line stood on the light emitting planes 18 and 39. A thick solid arrow K denotes an outgoing direction vector showing an outgoing direction of light outputted from the point F. Here, an angle made by the vertical line FG and the outgoing direction vector K denotes the elevation angle ξ. Furthermore, a circle M with a central focus on the point G, coming in contact with the outgoing direction vector K, and parallel to the light emitting plane 18 or 39, is considered. A plane including a line segment connecting the light source 15 or 35 and the point F and the vertical line FG is assumed; and of two intersections of the plane and the circle M, a point of light guide direction (a farther side from the light source) is set as N1, and a point of a light source direction (a nearer side to the light source) is set as N2. Furthermore, a contact point of the circle M and the outgoing direction vector K is set as Q. Then, an angle measured in counterclockwise rotation from a GN1 direction to a GQ direction is an azimuthal angle ζ. Put simply, seen from a direction perpendicular to the light emitting plane 18 or 39, an angle measured in counterclockwise rotation from the light guide direction to the light emitting direction is an azimuthal angle ζ (refer to FIG. 16).

In the case of the prior art 1, as shown in FIG. 13A, the outgoing light extends long in the light guide direction and this becomes the bright line. Whereas, in the cases of the prior art 2 and the first embodiment, as shown in FIGS. 13A and 13C, the outgoing light gathers at the central portion (in the vicinity of a direction a perpendicular to the light emitting plane) to suppress generation of the bright line.

Figure 15:
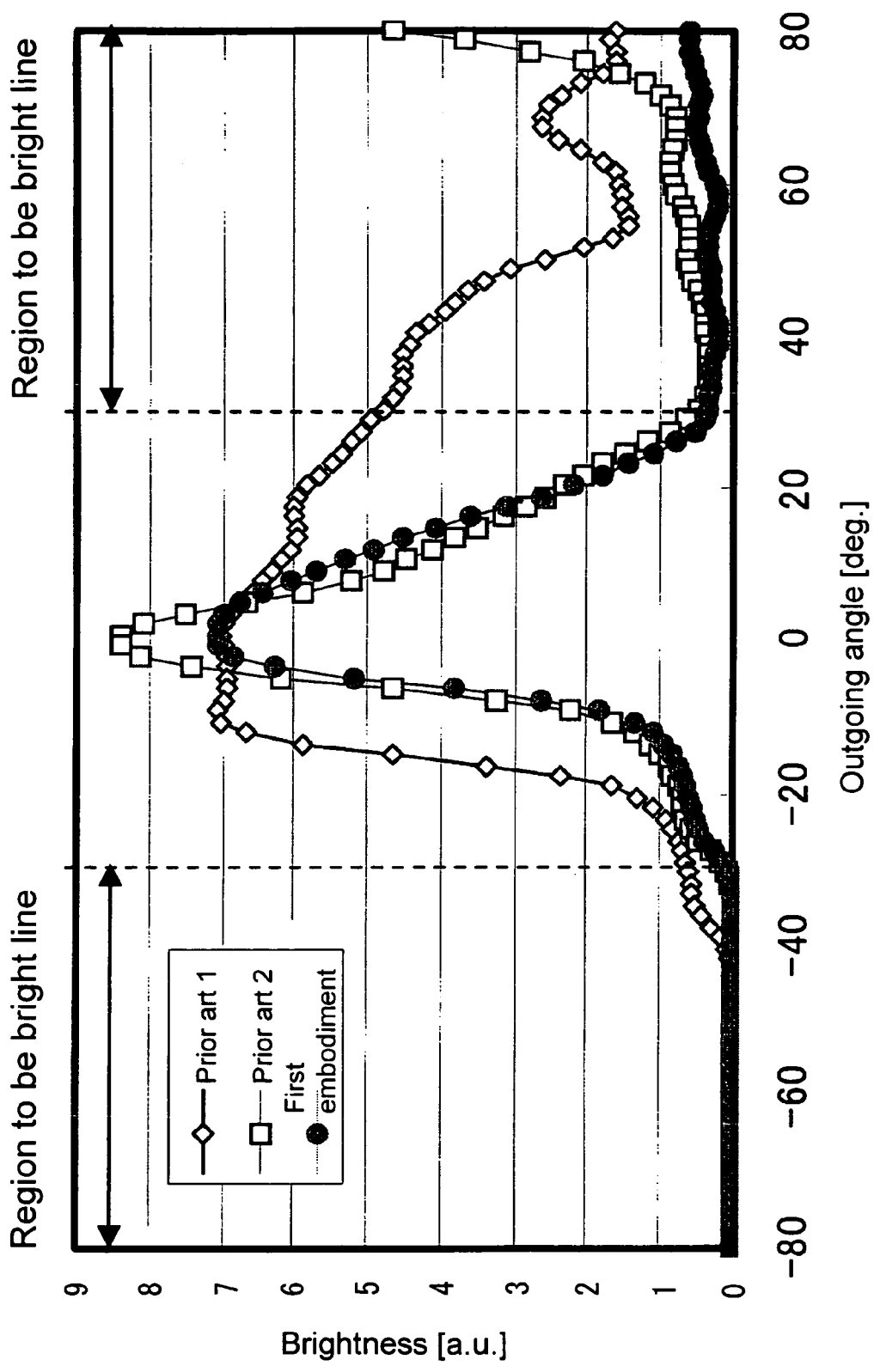
FIG. 15 shows a view of directional patterns of the prior art 1, the prior art 2, and the first embodiment in a direction parallel to a light guide direction.

FIG. 15 shows a view of directional patterns of the prior art 1 (symbol: ◇), the prior art 2 (symbol: □), and the first embodiment (symbol: ●) in the direction parallel to the light guide direction. A horizontal axis in FIG. 15 shows an outgoing angle of light in the light guide direction. The outgoing angle of the light in the light guide direction is an outgoing angle in the plane perpendicular to the light emitting plane including the light guide direction shown in FIG. 16B as the X3-X3 cross section of FIG. 16A. This is equal to the elevation angle ξ when the azimuthal angle ζ is 0° and 180°. However, in FIG. 15, as shown in FIG. 16, the outgoing angle when the azimuthal angle is 180°, is given by a minus symbol to the elevation angle ξ. A vertical axis of FIG. 15 shows brightness of the light outputted to the direction of each outgoing angle. Furthermore, in FIG. 15, regions which become the bright lines are shown.

Figure 1A:
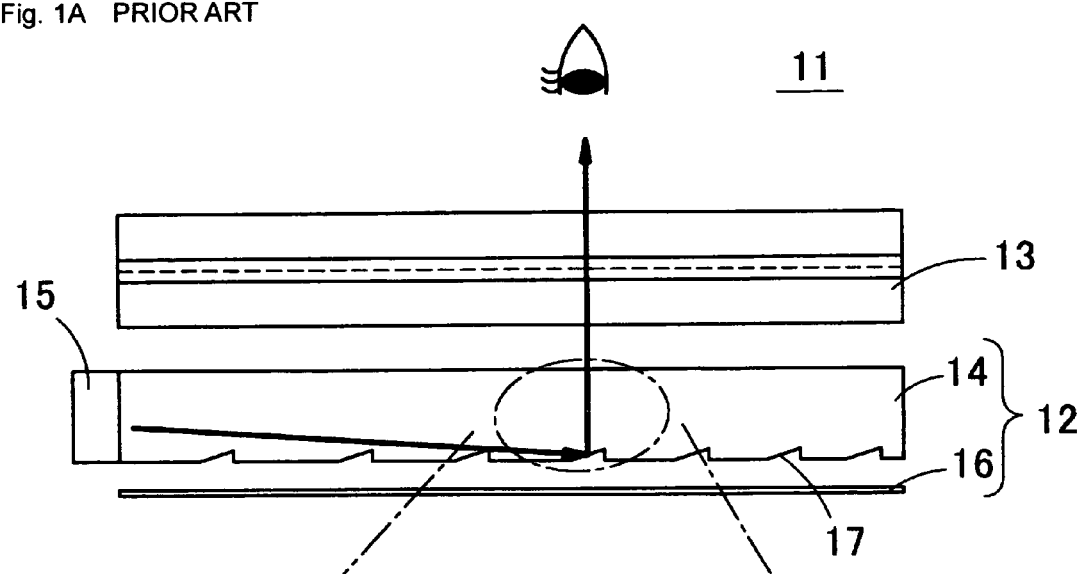
FIG. 1A shows a schematic sectional view of a structure of a liquid crystal display of a prior art 1.
Figure 1B:
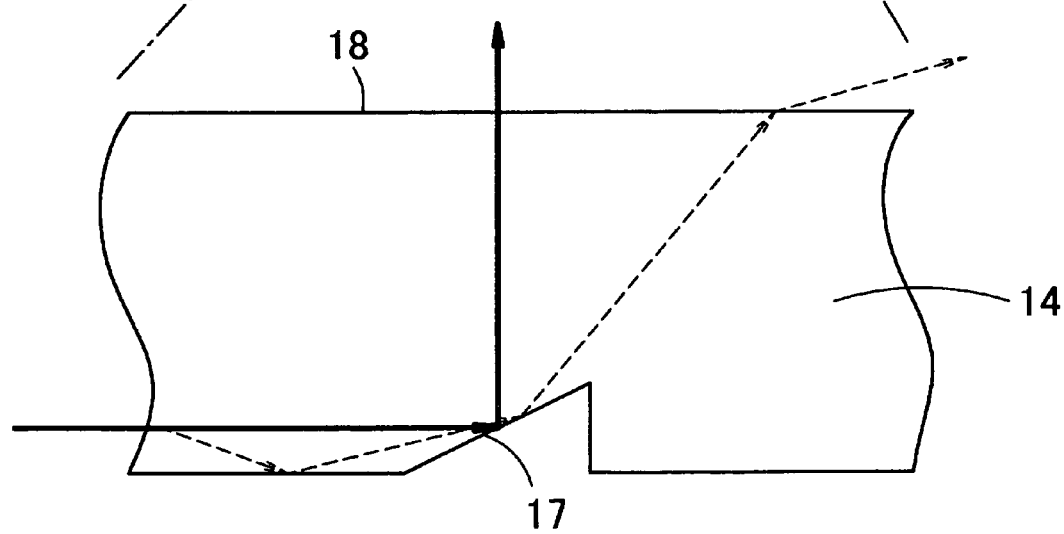
FIG. 1B shows an enlarged view of a part of FIG. 1A.
Figure 2:
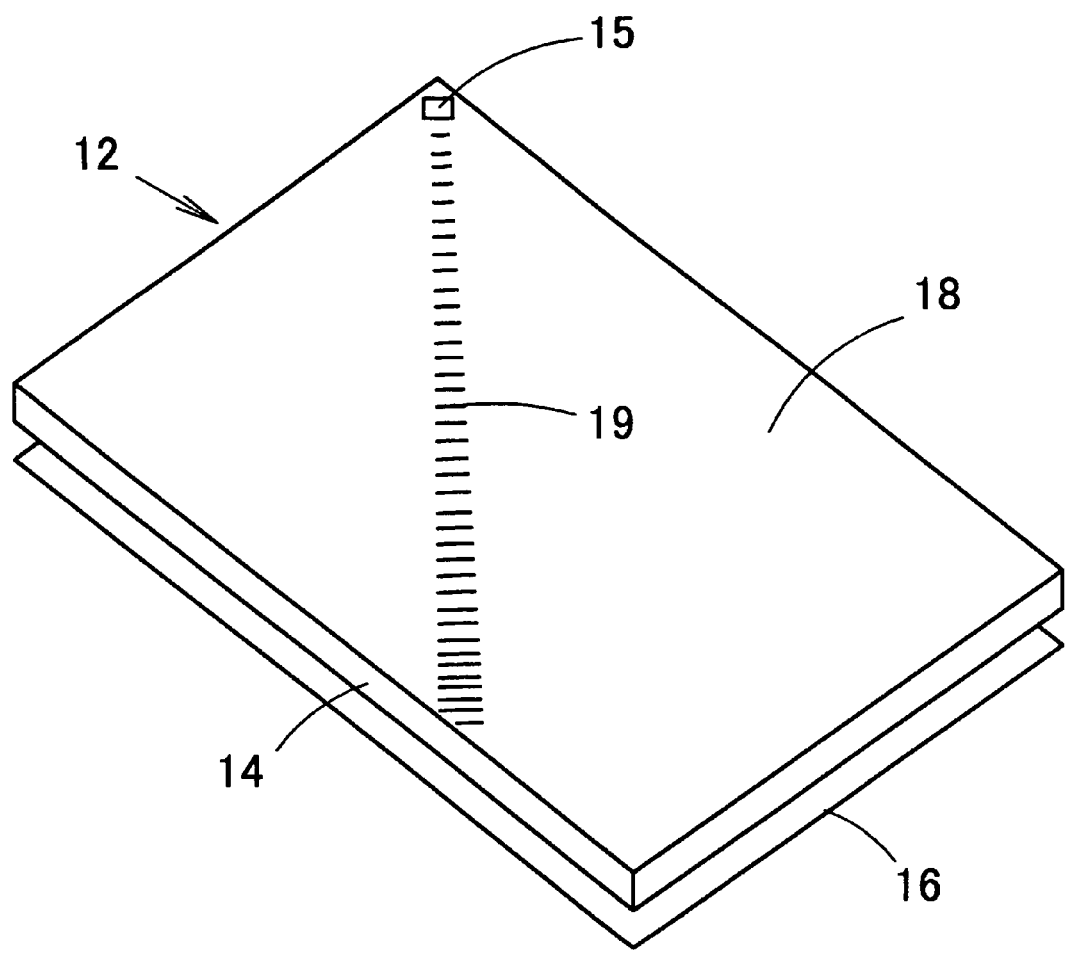
FIG. 2 shows a schematic perspective view of a back light used in the liquid crystal display of the prior art 1.
Figure 3A:
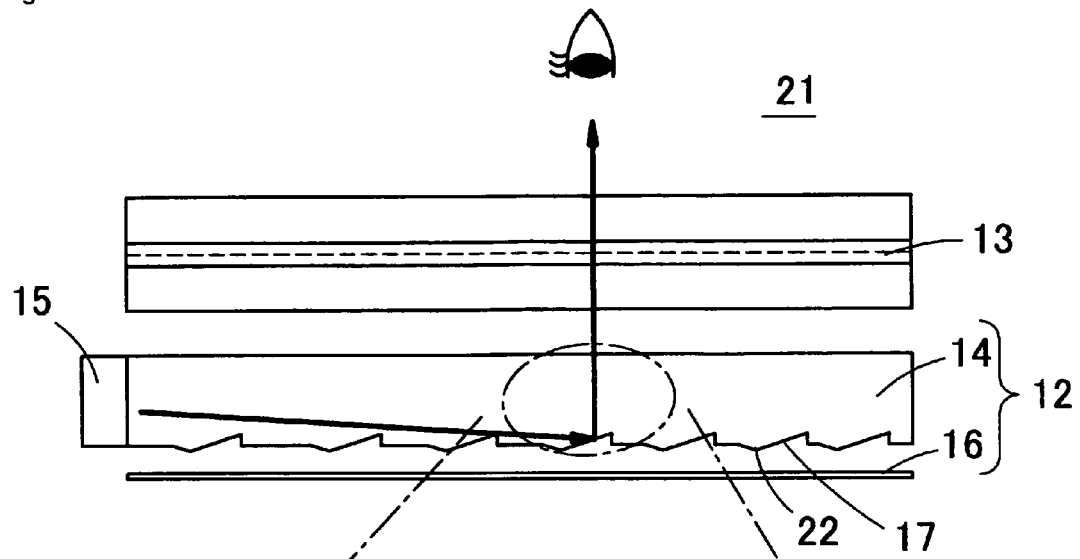
FIG. 3A shows a schematic sectional view of a structure of a liquid crystal display of a prior art 2.
Figure 3B:
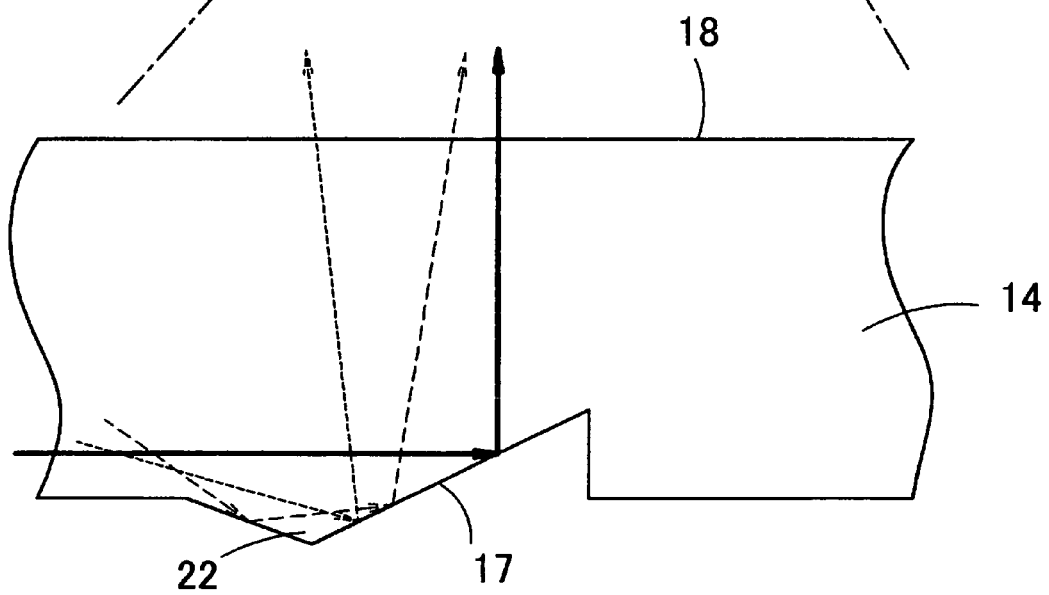
FIG. 3B shows an enlarged view of a part of FIG. 3A.
Figure 4:
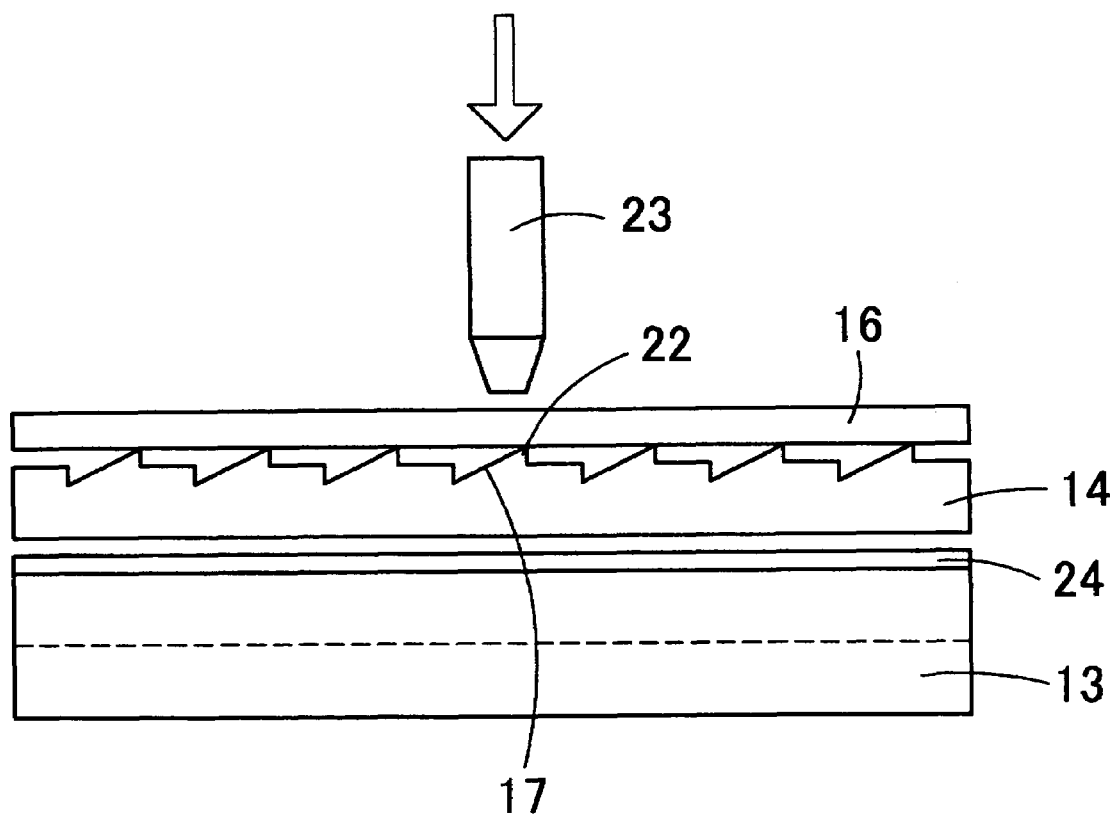
FIG. 4 shows a schematic view for explaining a method for observing crush of a projection formed on the backside of a light guide plate of a liquid crystal display.

According to FIG. 15, in the prior art 1, the brightness in the region which becomes the bright line is high and therefore the bright line 19 as shown in FIG. 2 is generated. Whereas, in the first embodiment, the brightness becomes small equal to the prior art 2 in the region which becomes the bright line and consequently the bright line can be suppressed to the level equal to the prior art 2. Furthermore, in a direction perpendicular to the light emitting plane (a direction in which the outgoing angle is substantially 0°), the brightness of the first embodiment becomes a little bit smaller than that of the prior art 2; however, it becomes the brightness equal to the prior art 1. Therefore, according to the surface light source device of the first embodiment, it turns out that degradation of image quality due to the bright line can be solved without degrading the front face brightness, as compared with the surface light source device of the prior art 1. In addition, as shown in FIG. 4, even as a result of performing the anti-pressing strength inspection, damage of the pattern is generated in the prior art 2, however, damage of the pattern is not generated in the surface light source devices of the prior art 1 and the first embodiment.

Figure 17:
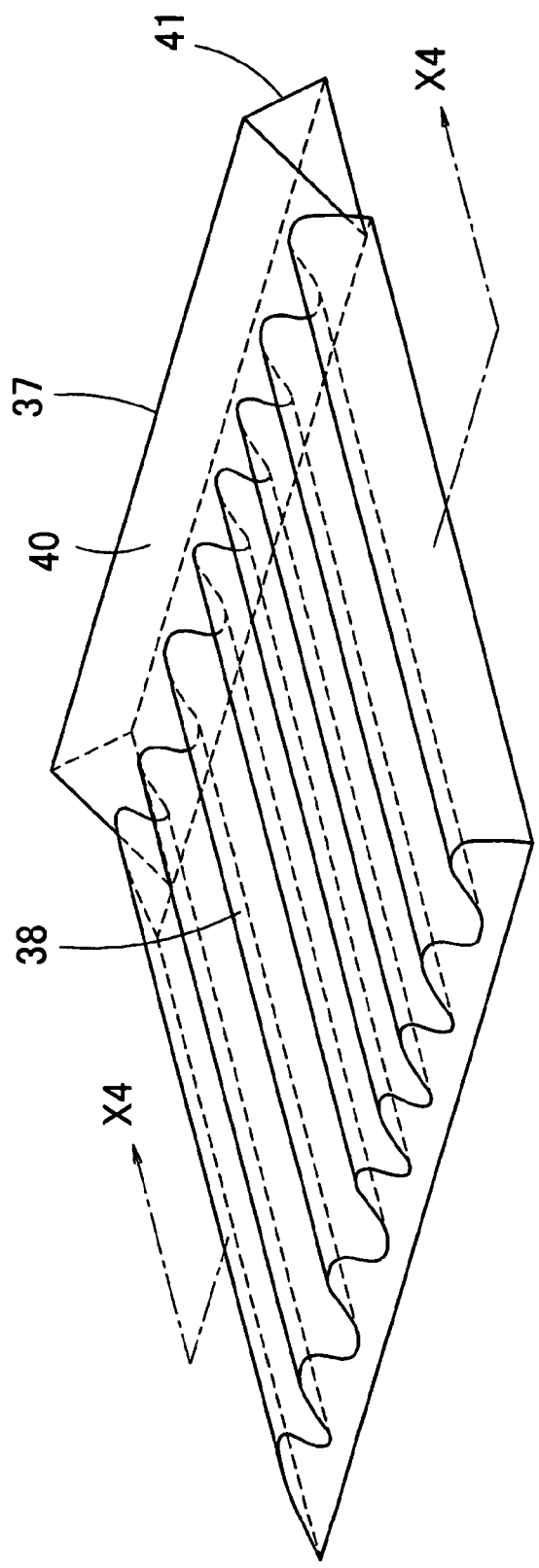
FIG. 17 shows a schematic perspective view of a deflection pattern provided on the backside of a light guide plate and a diffusion pattern in a surface light source device according to a second embodiment of the present invention.
Figure 18:
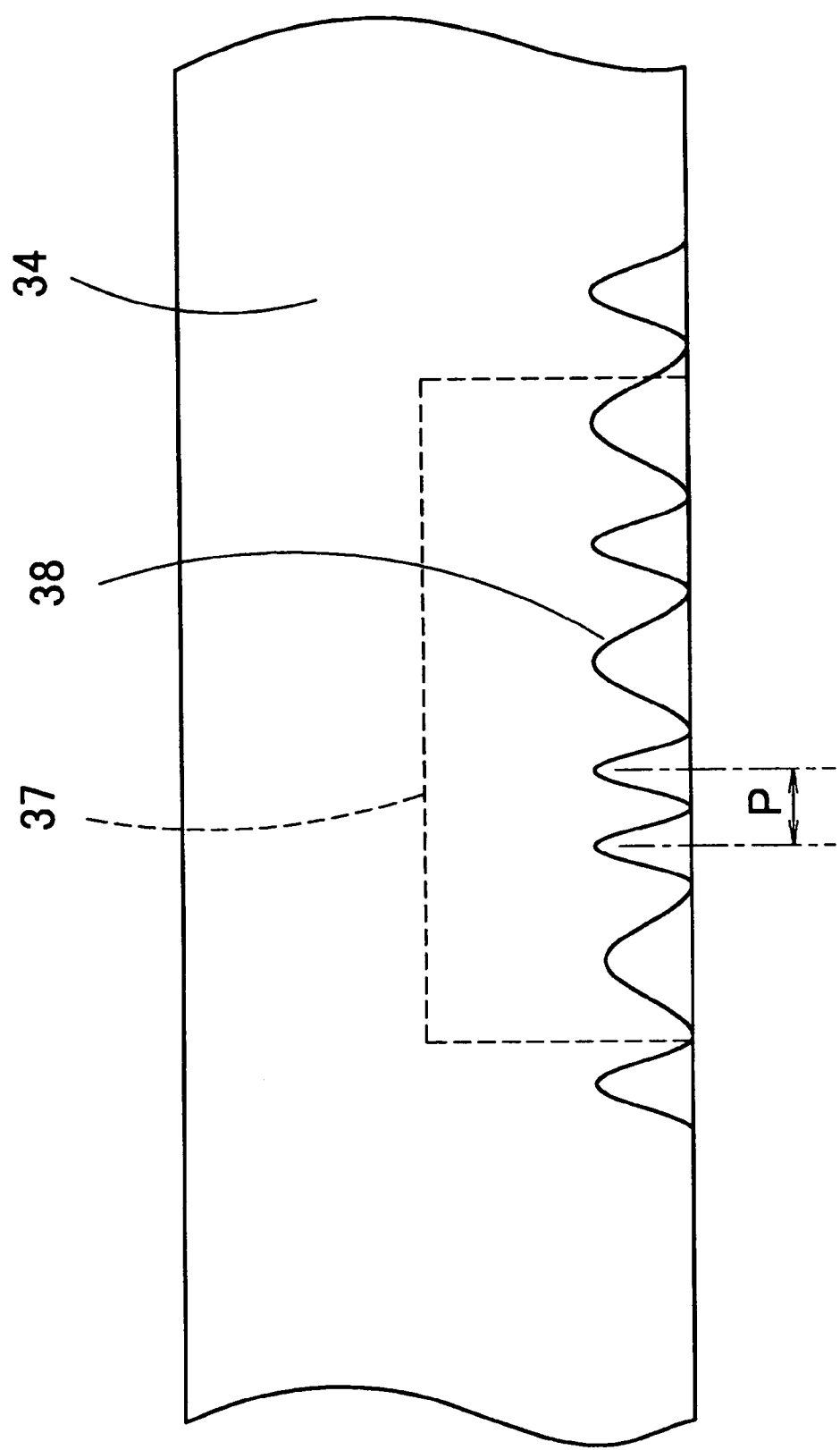
FIG. 18 shows a sectional view taken along the line X4-X4 shown in FIG. 17.

FIG. 17 shows a schematic perspective view of a deflection pattern 37 and a diffusion pattern 38 provided on the backside of a light guide plate in a surface light source device according to a second embodiment. Furthermore, FIG. 18 shows a view of a cross section of the diffusion pattern 38 and a sectional view taken along the line X4-X4 shown in FIG. 17.

In the second embodiment, one incorporating a tricolor LED with red green and blue colors, is used as a light source 35. Then, red light, green light, and blue light are mixed to generate white light.

Furthermore, in the second embodiment, a diffusion pattern 38 is of a substantially sine wave shape in cross section; however, horizontal distance between sine wave shaped adjacent projections (pitch P of the diffusion pattern 38) is not constant but changes in a random manner. The minimum value Pmin of the pitch P of the diffusion pattern 38 is not less than 1.5 μm and the maximum value Pmax of the pitch P of the diffusion pattern 38 is a size of not less than twice the minimum value. For example, in a good embodiment, the minimum value Pmin of the pitch P of the diffusion pattern 38 is 2.5 μm and the maximum value Pmax of the pitch P of the diffusion pattern 38 is 5 μm.

The reason why the minimum value Pmin of the pitch P of the diffusion pattern 38 is not less than 1.5 μm is to set the ratio of the zero order light included in the light reflected at the diffusion pattern 38 to be not more than 50%, as described in FIG. 12.

Figure 19:
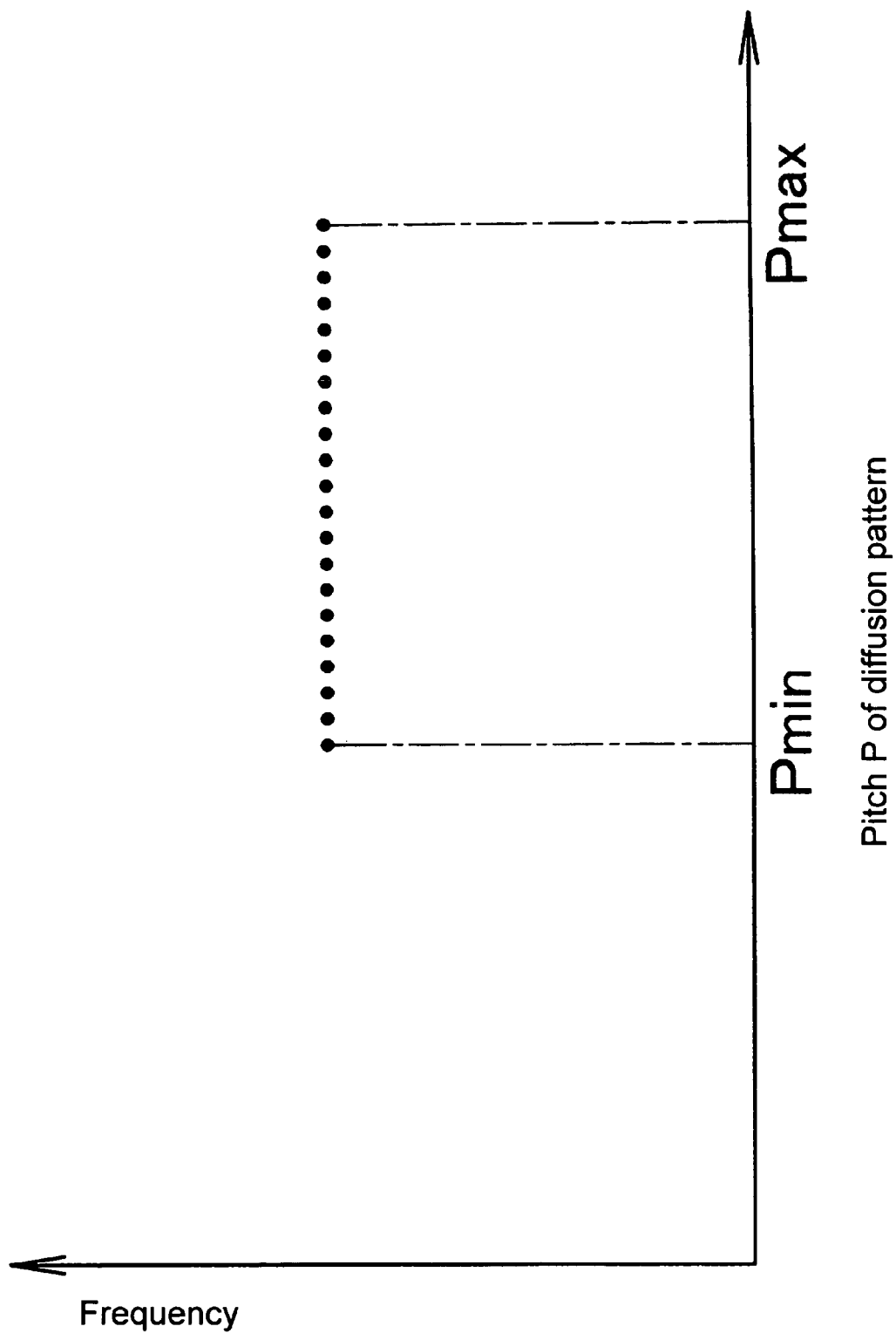
FIG. 19 shows a view of a relationship between pitch of a diffusion pattern and frequency.

However, although the pitches P of the diffusion patterns 38 are random, the pitches P between the adjacent projections of the diffusion patterns 38 formed in a random manner are formed so as to be appeared in the light guide plate at a substantially the same frequency. That is, when the diffusion patterns 38 formed on the whole of the light guide plate 34 or the diffusion pattern 38 formed in any part region of the light guide plate 34 are considered, as shown in FIG. 19, the diffusion patterns 38 disposed for each pitch P are included each other in the same number (frequency). Therefore, light diffusion state by the diffusion patterns 38 becomes substantially uniform on the whole of the light guide plate 34, so that uneven brightness is difficult to be generated in the light guide plate 34.

Figure 20:
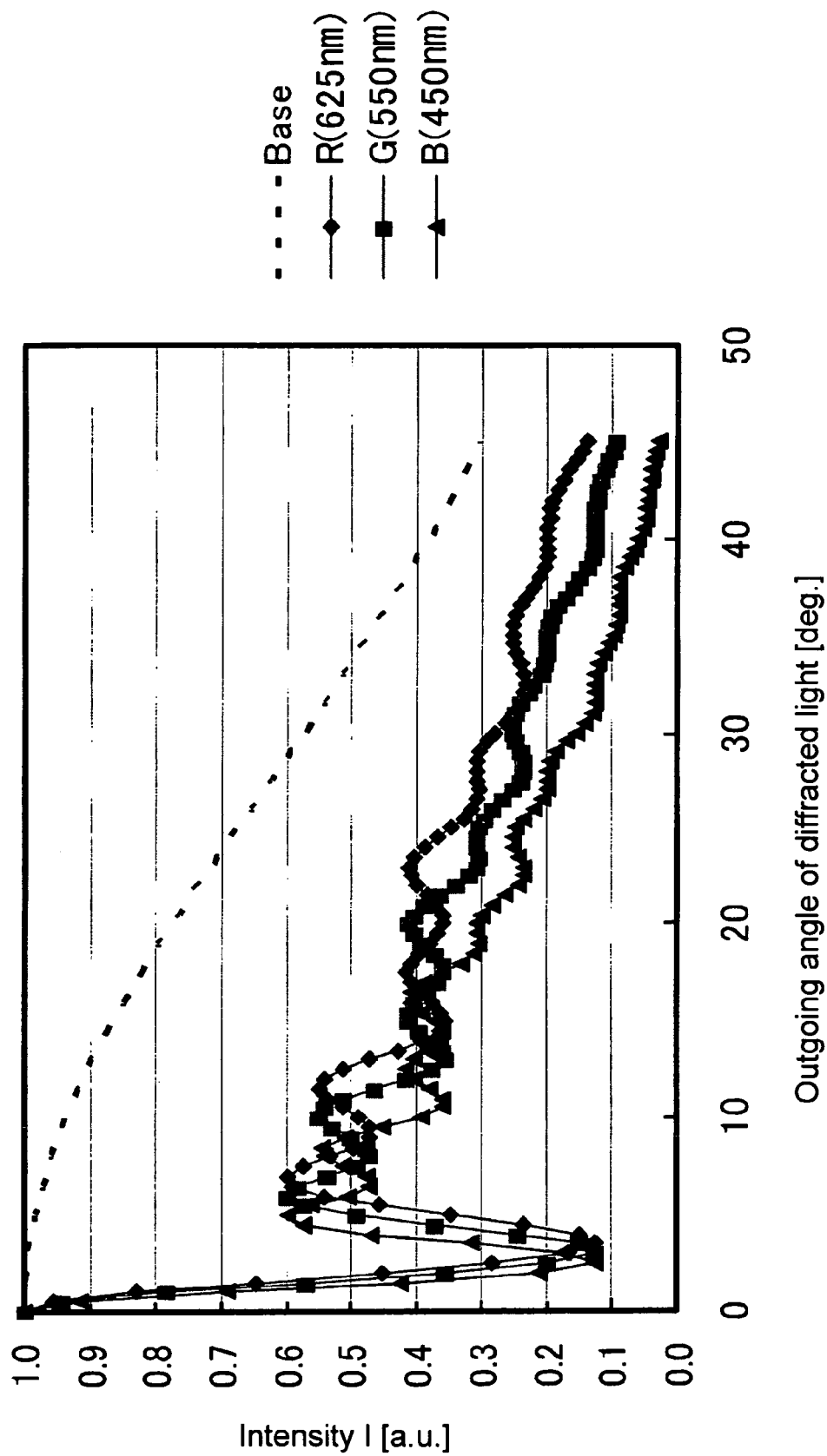
FIG. 20 shows a view of brightness in each outgoing direction of red light (R), green light (G), and blue light (B) diffracted and reflected by the diffusion patterns in the second embodiment.
Figure 21:
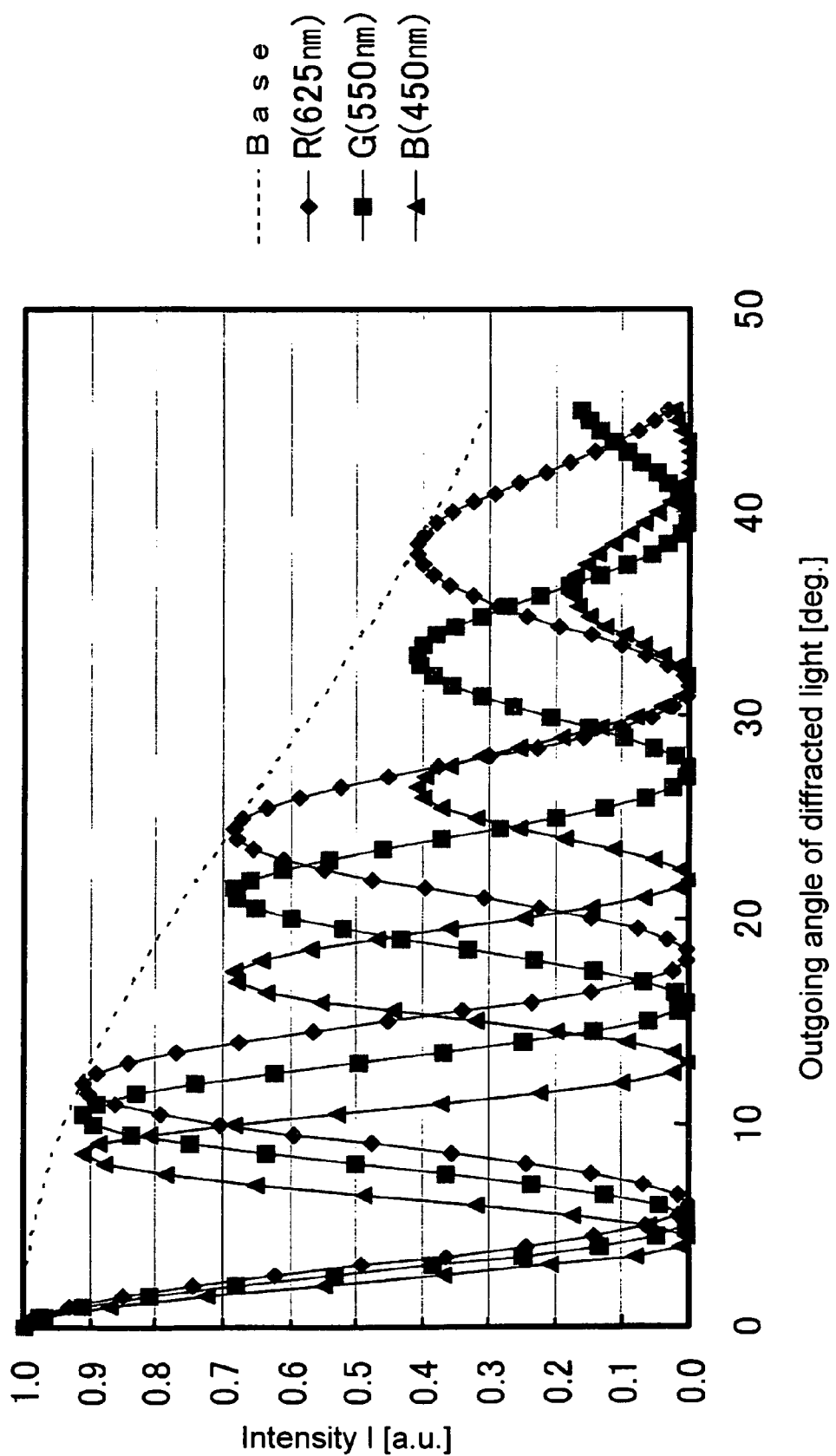
FIG. 21 shows a view of brightness in each outgoing direction of red light (R), green light (G), and blue light (B) diffracted and reflected by the diffusion patterns in the first embodiment.

FIG. 20 shows brightness in each outgoing direction of red light (R), green light (G), and blue light (B) diffracted and reflected by the diffusion patterns 38 in the second embodiment having the diffusion pattern 38 with random pitches. Furthermore, FIG. 21 shows brightness in each outgoing direction of red light (R), green light (G), and blue light (B) diffracted and reflected by the diffusion patterns 38 in the first embodiment having the diffusion pattern 38 with a constant pitch. When the light source uses a white light source of mixed type composed of red light, green light, and blue light in the surface light source device having the diffusion pattern 38 with a constant pitch; as shown in FIG. 21, diffracted light (diffracted light except for zero order light) reflected at the diffusion pattern 38 generate color shift and the light emitting plane of the surface light source device seems to be colored like a rainbow. Whereas, in the case of the second embodiment in which the pitches of the diffusion pattern 38 are uneven from Pmin to Pmax (≈2×Pmin), as shown in FIG. 20, diffracted light other than the zero order light reduces by half, decreases color separation at the light emitting plane, and the degree of color mixture of red light, green light, and blue light is enhanced to be able to output white light from the light emitting plane.

In addition, as for other than the optimum value example and design conditions described here, the optimum value example and design conditions described in the first embodiment can be applicable.

Figure 22:
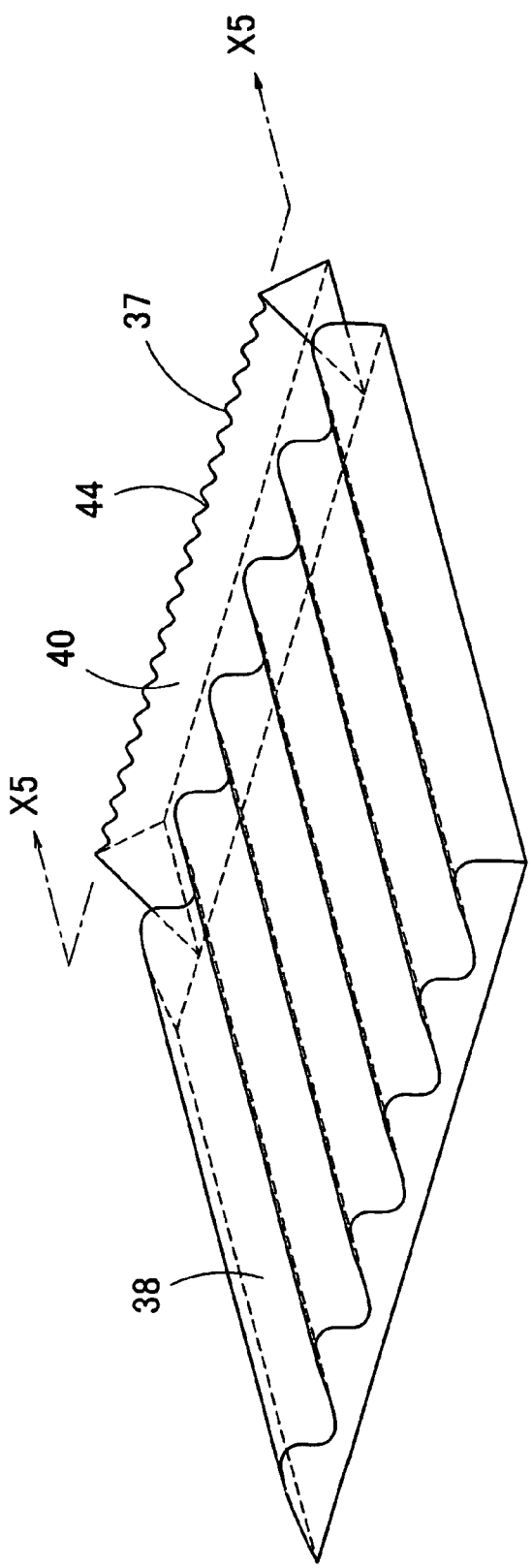
FIG. 22 shows a schematic perspective view of shapes of a deflection pattern and a diffusion pattern provided on the backside of a light guide plate in a surface light source device according to a third embodiment of the present invention.
Figure 23:
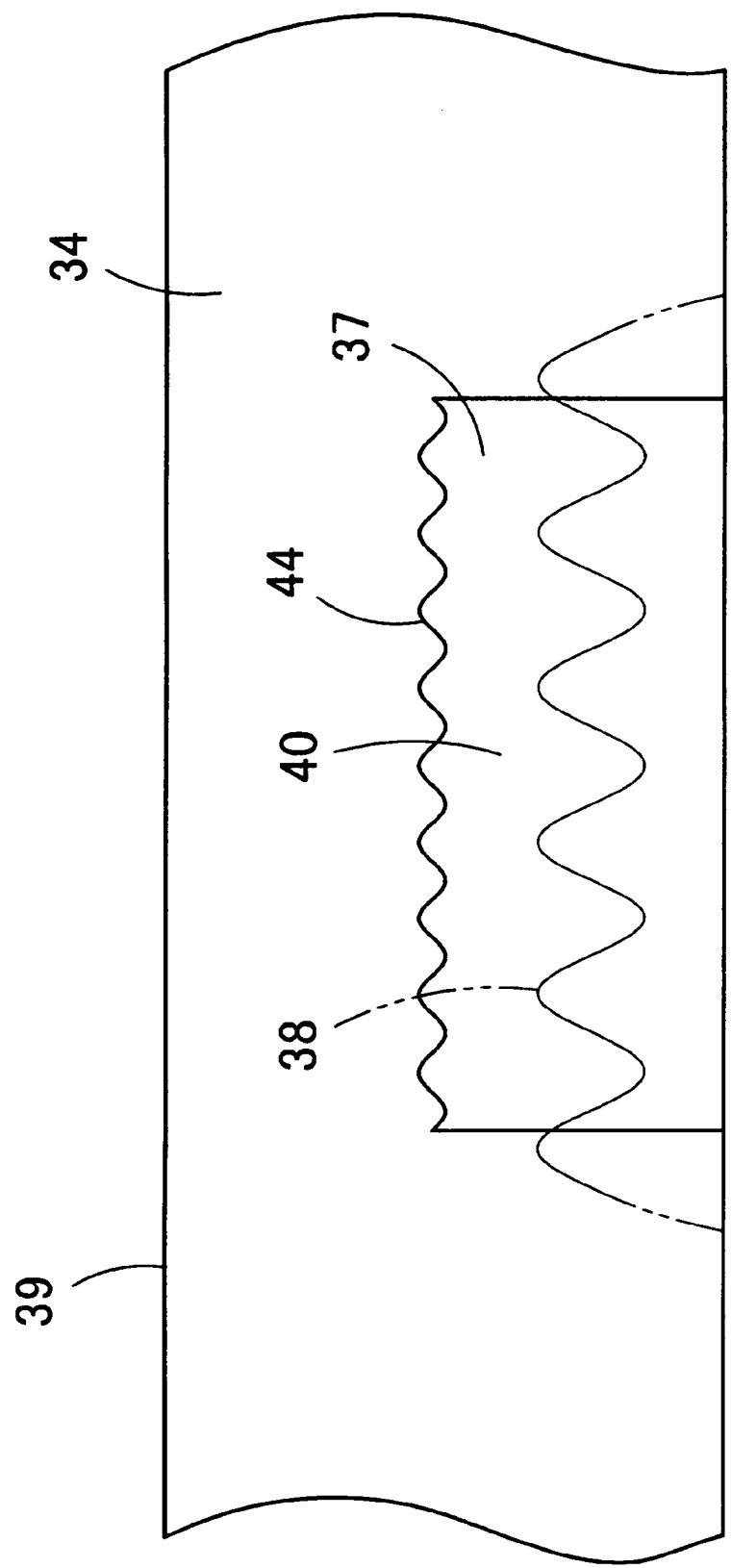
FIG. 23 shows a sectional view taken along the line X5-X5 shown in FIG. 22.

FIG. 22 shows a schematic perspective view of shapes of a deflection pattern 37 and a diffusion pattern 38 provided on the backside of a light guide plate in a surface light source device according to a third embodiment of the present invention. FIG. 23 shows a view of a cross section of the diffusion pattern 38 and a sectional view taken along the line X5-X5 shown in FIG. 22. In the third embodiment, a fine corrugated pattern 44 is formed along a ridge line of the deflection pattern 37 (the highest position: a point D' in cross section). A sine wave shape pattern is exemplified in the drawing; however, a different pattern may be used. Furthermore, a pitch of the corrugated pattern 44 is equal to a pitch P of the diffusion pattern 38. Further, the maximum height Rmax of the diffusion pattern 38 and the maximum difference of elevation Rmax2 of the corrugated pattern 44 are set as the following equation 4.

$$0.2 \ \mu m \leq Rmax + Rmax2 \leq 0.5 \times H \qquad \text{(equation 4)}$$

where, H is a vertical height of the deflection pattern 37.

Figure 24:
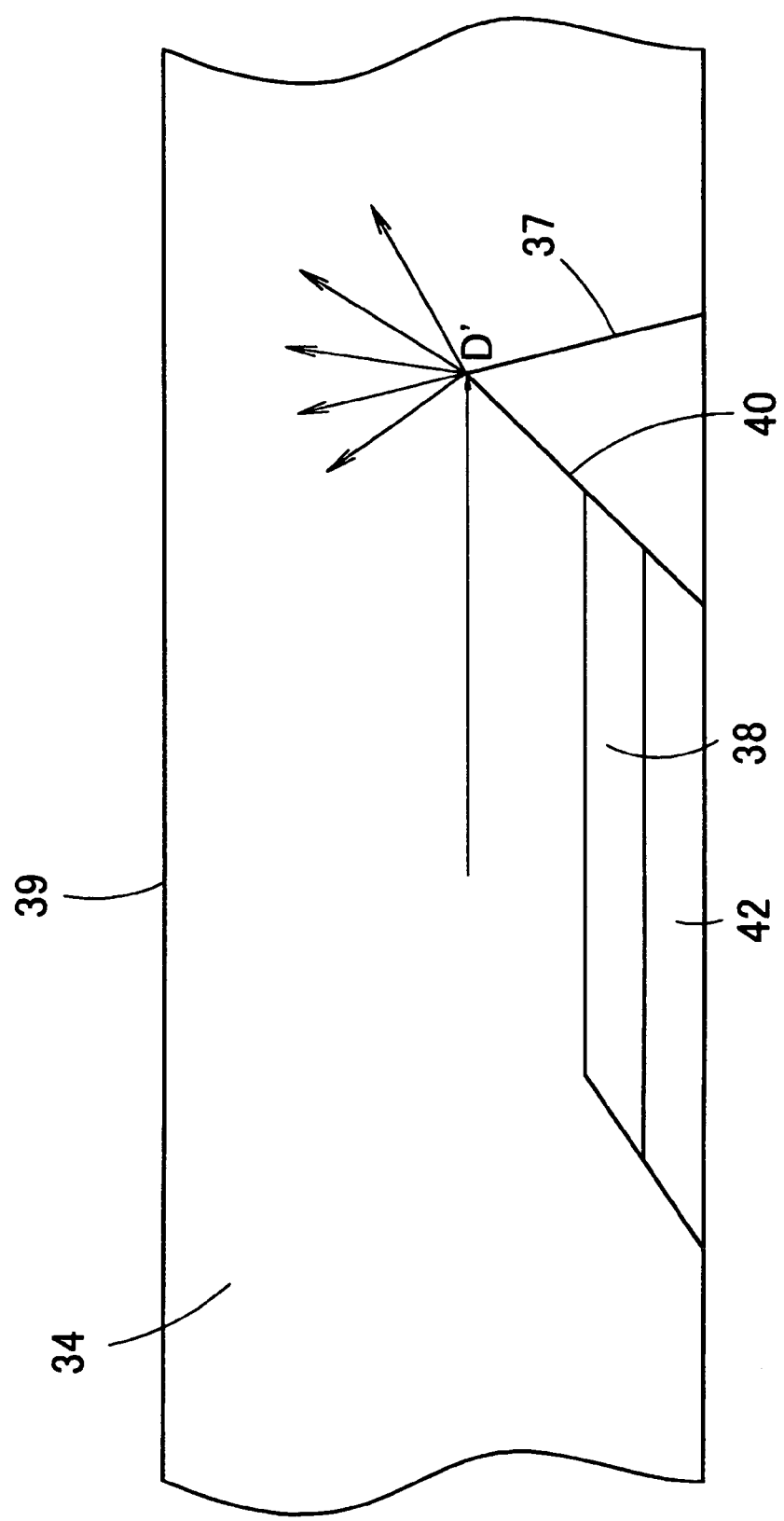
FIG. 24 shows a schematic sectional view for explaining a state in which a bright line is generated by light diffused at a ridge line of the deflection pattern.

For example, in the case of the deflection pattern 37 of the triangle prism shape as in the first embodiment, the ridge line of the deflection pattern 37 is not formed at a sharp angle when forming the light guide plate 34 and the ridge line of the deflection pattern 37 is rounded due to filling defect of resin. Therefore, as shown in FIG. 24, light incident to the ridge line of the deflection pattern 37 is scattered within the vertical plane of the light guide direction due to the rounded ridge line of the deflection pattern 37 to cause generation of the bright line on the light emitting plane 39.

On the other hand, in the third embodiment, the corrugated pattern 44 is formed along the ridge line of the deflection pattern 37 and therefore the light incident to the ridge line of the deflection pattern 37 is scattered not only to within the vertical plane of the light guide direction but also to a direction out of the vertical plane. In other words, when seen from a direction perpendicular to a light emitting plane 39, the light reflected at the ridge line of the deflection pattern 37 is also scattered to lateral directions with respect to the light guide direction. As a result, according to the third embodiment, generation of the bright line at the light emitting plane 39 can be effectively suppressed.

Figure 25:
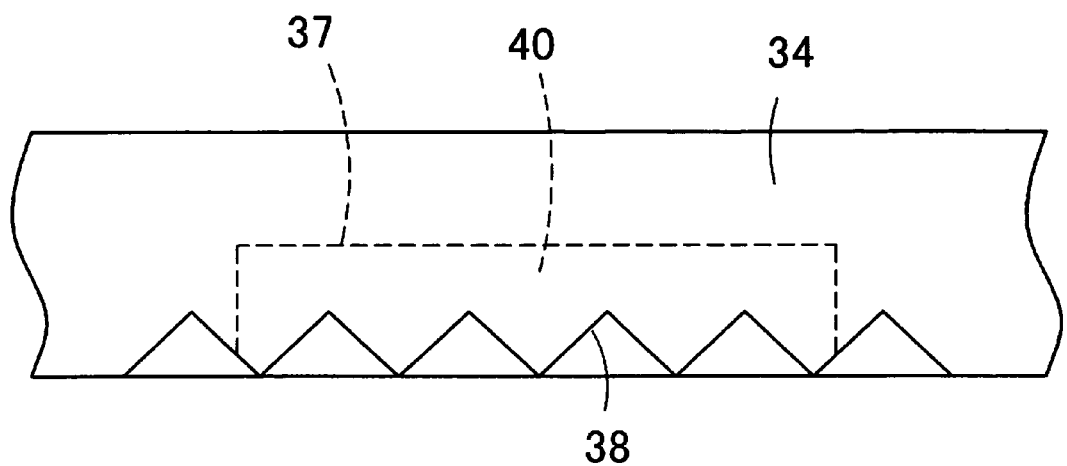
FIG. 25 shows a cross-sectional view of a different pattern shape of the diffusion pattern.

In addition, in the first to third embodiments, the diffusion patterns 38 having a sine wave shaped cross section are described; however, as shown in FIG. 25, a diffusion pattern 38 may have a cross section of a triangular wave shape in which a substantially isosceles triangle pattern is continuously repeated. In this case, it is preferable that the maximum height Rmax of the diffusion pattern 38 is set as the following equation.

$$0.2\ \mu m \leq Rmax \leq 0.5 \times H \text{ (where, } H \text{ is the height of the deflection pattern 37)}$$

Figure 26A:
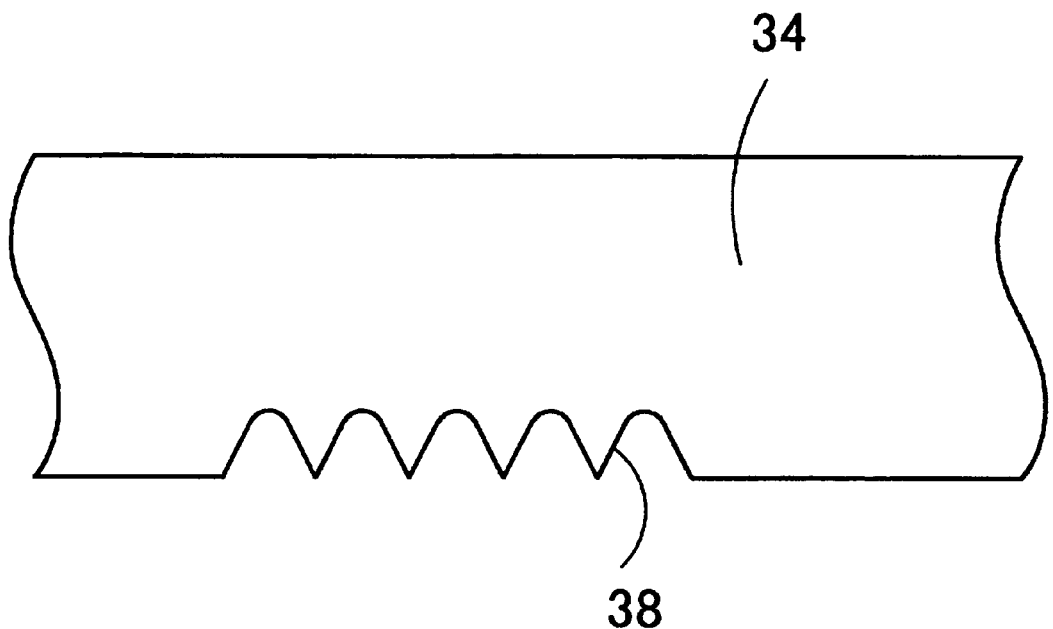
FIG. 26A shows a cross-sectional view of a further different pattern shape of a diffusion pattern.
Figure 26B:
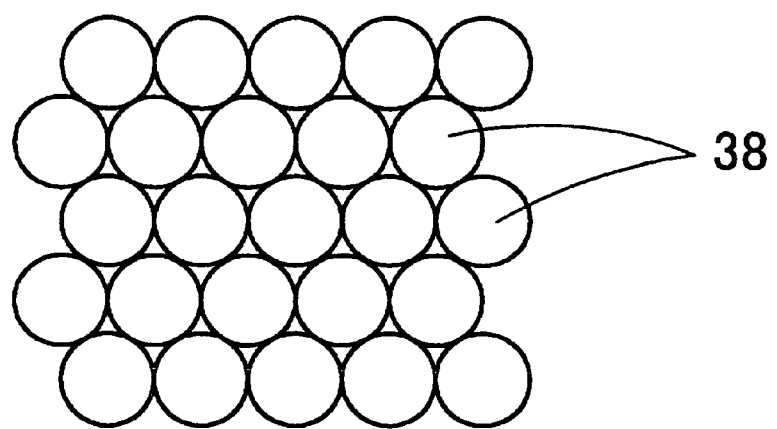
FIG. 26B shows a plan view thereof.
Figure 27A:
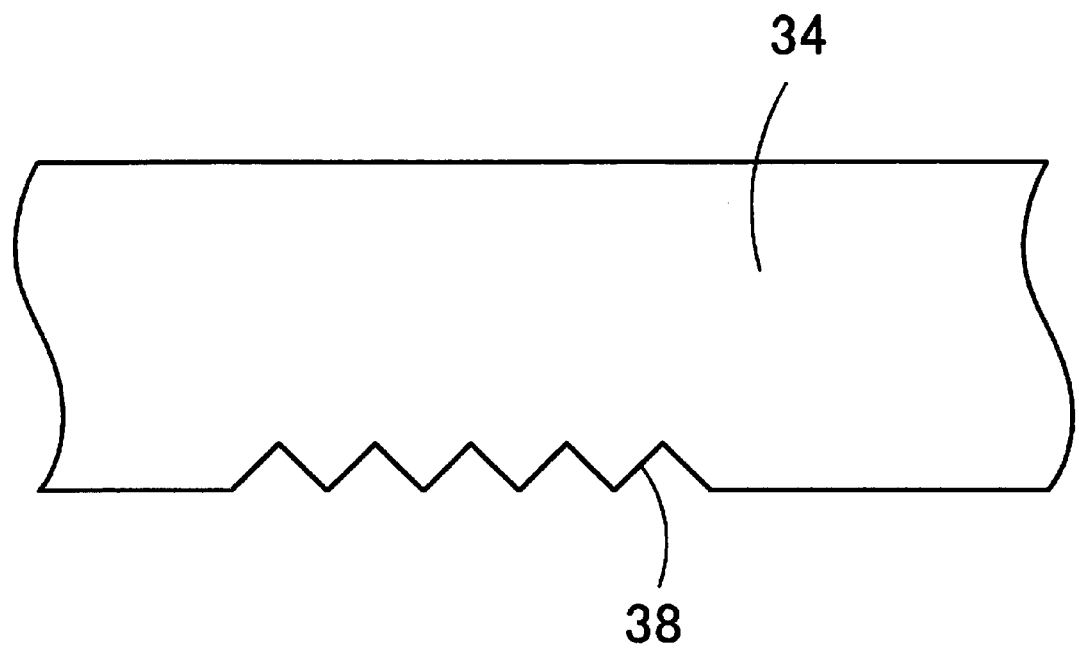
FIG. 27A shows a cross-sectional view of a further different pattern shape of a diffusion pattern.
Figure 27B:
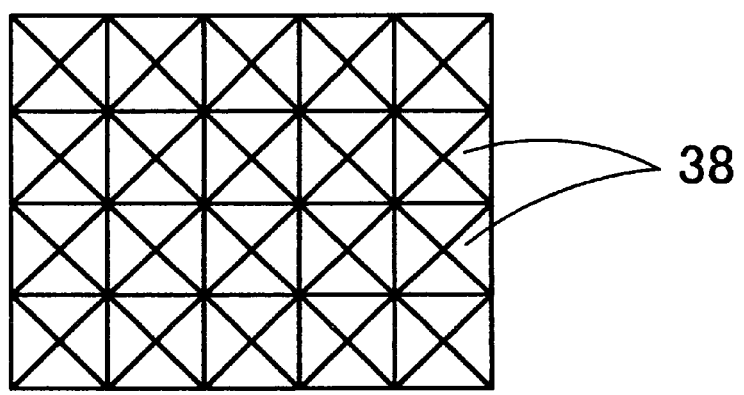
FIG. 27B shows a plan view thereof.

The diffusion pattern 38 does not need to be a rod-like shape extending in the light guide direction; however, it may be one in which a quaquaversal pattern such as a hemispheric or a semi-elliptical spherical shaped pattern is arranged almost without clearance, as shown in FIGS. 26A and 26B, for example. Furthermore, as shown in FIGS. 27A and 27B, it may be one in which a cone shaped, an elliptical cone shaped, a pyramid shaped, or a square pyramid shaped pattern is arranged without clearance.

Figure 28:
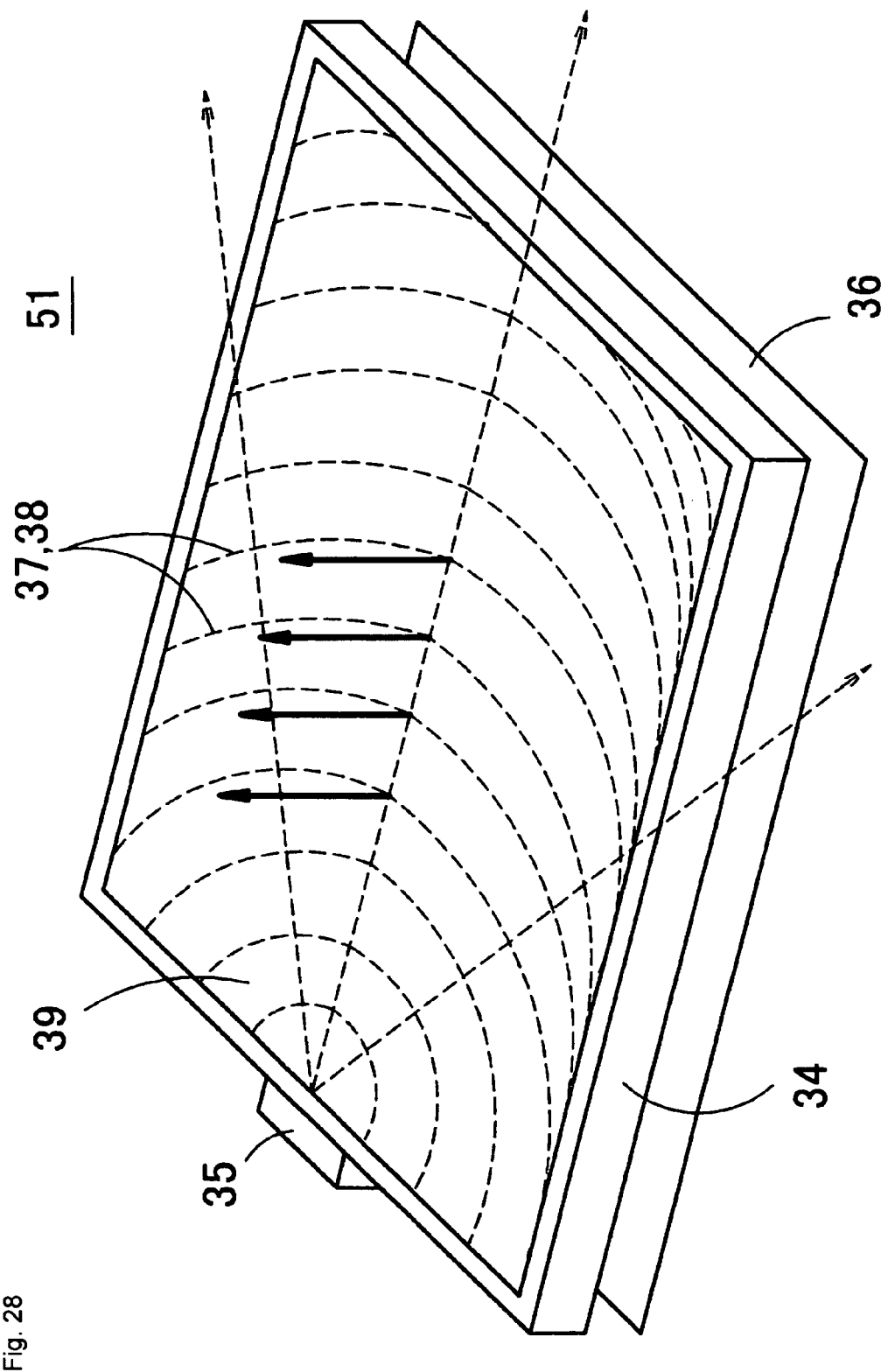
FIG. 28 shows a perspective view for explaining a modification example of a surface light source device.

FIG. 28 shows a perspective view of a surface light source device 51 in which a light source 35 is arranged at the central portion of one side of a light guide plate 34. The light source 35 is arranged at a corner portion of the light guide plate 34 in the first embodiment; however, the light source 35 maybe arranged at the central portion of the one side of the light guide plate 34 as shown in FIG. 28. Also in this case, a light guide direction is a direction connecting the light source 35 and deflection patterns 37; each of the deflection patterns 37 is arranged so that its width direction intersects with the light guide direction; and a diffusion pattern 38 changes cross section shape (pattern) along a direction intersecting to the light guide direction.

Figure 29:
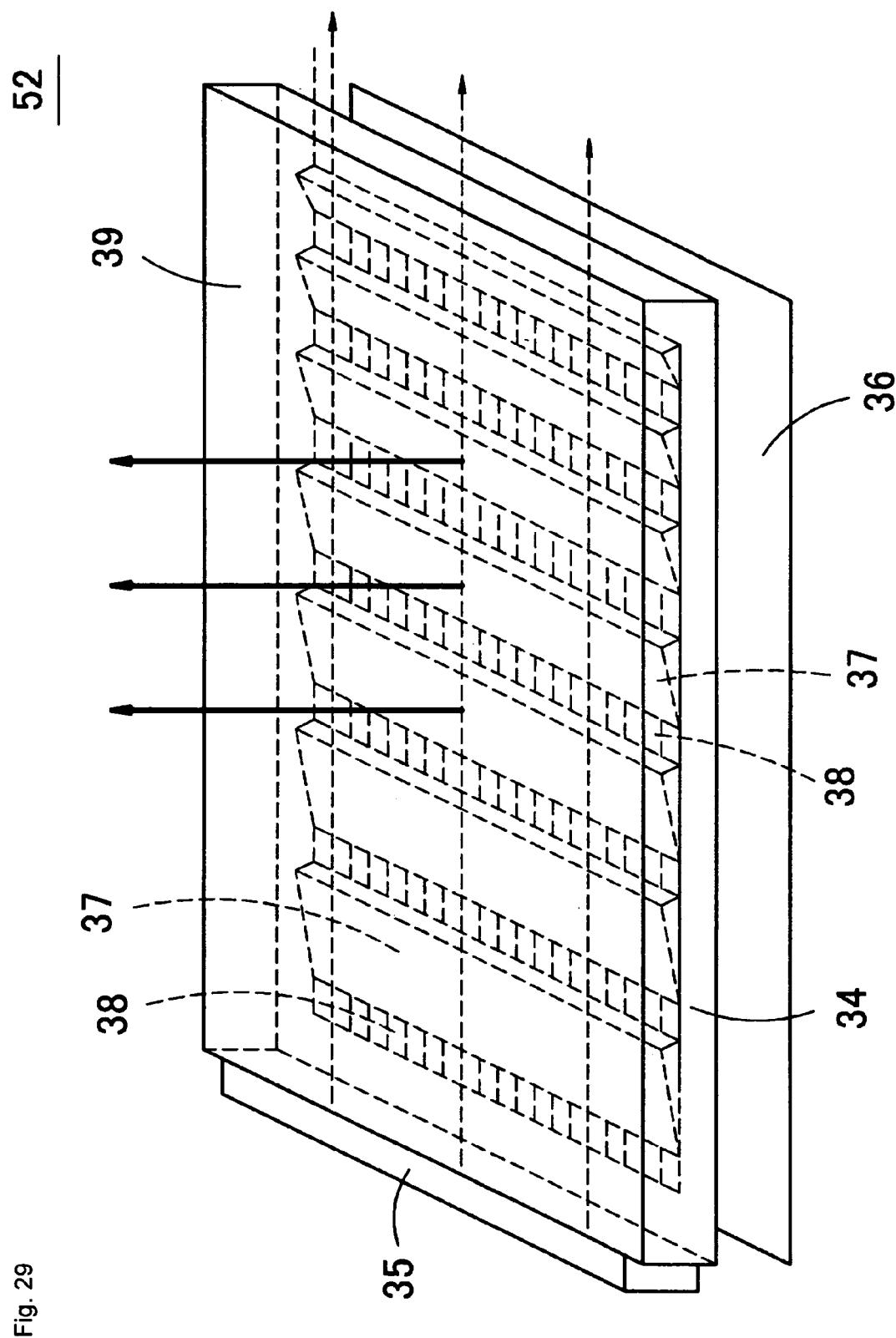
FIG. 29 shows a perspective view of a surface light source device according to a fourth embodiment of the present invention.

FIG. 29 shows a perspective view of a surface light source device 52 according to a forth embodiment in which a light source 35 is arranged along one side of a light guide plate 34. The surface light source device 52 includes the light source 35 (a linear light source), which is substantially extended over the whole length of one side of the light guide plate 34. Deflection patterns 37 and diffusion patterns 38 are formed on the backside of the light guide plate 34.

Here, the light guide direction will be described. A light guide direction denotes a direction connecting each of the deflection patterns 37 and the light source 35 in the shortest distance; and it means a direction marked by a dash line shown in FIG. 29 in the surface light source device 52; that is, a direction perpendicular to a lengthwise direction of the light source 35, seen from a direction perpendicular to the light emitting plane 39. It defines that the light guide direction is the direction connecting each of the deflection patterns 37 and the light source 35 in the case of the small light source 35 (a point light source) shown in FIG. 5; however, new definition that "the light guide direction is the direction connecting each of the deflection patterns 37 and the light source 35 in the shortest distance" is one which extends the former definition and includes the former definition.

The deflection pattern 37 is formed in a triangular shaped cross section in a cross section along the light guide direction and extends in a uniform cross section along a direction intersecting to the light guide direction. Furthermore, pitch in the length direction of the light guide plate 34 shortens with being farther from the light source 35.

The diffusion pattern 38 is arranged on the side of the light source 35 side of the each deflection pattern 37; a pattern in cross section changes in a sine wave shape in a direction perpendicular to the light guide direction and extends in a uniform cross section in a direction parallel to the light guide direction.

Figure 30:
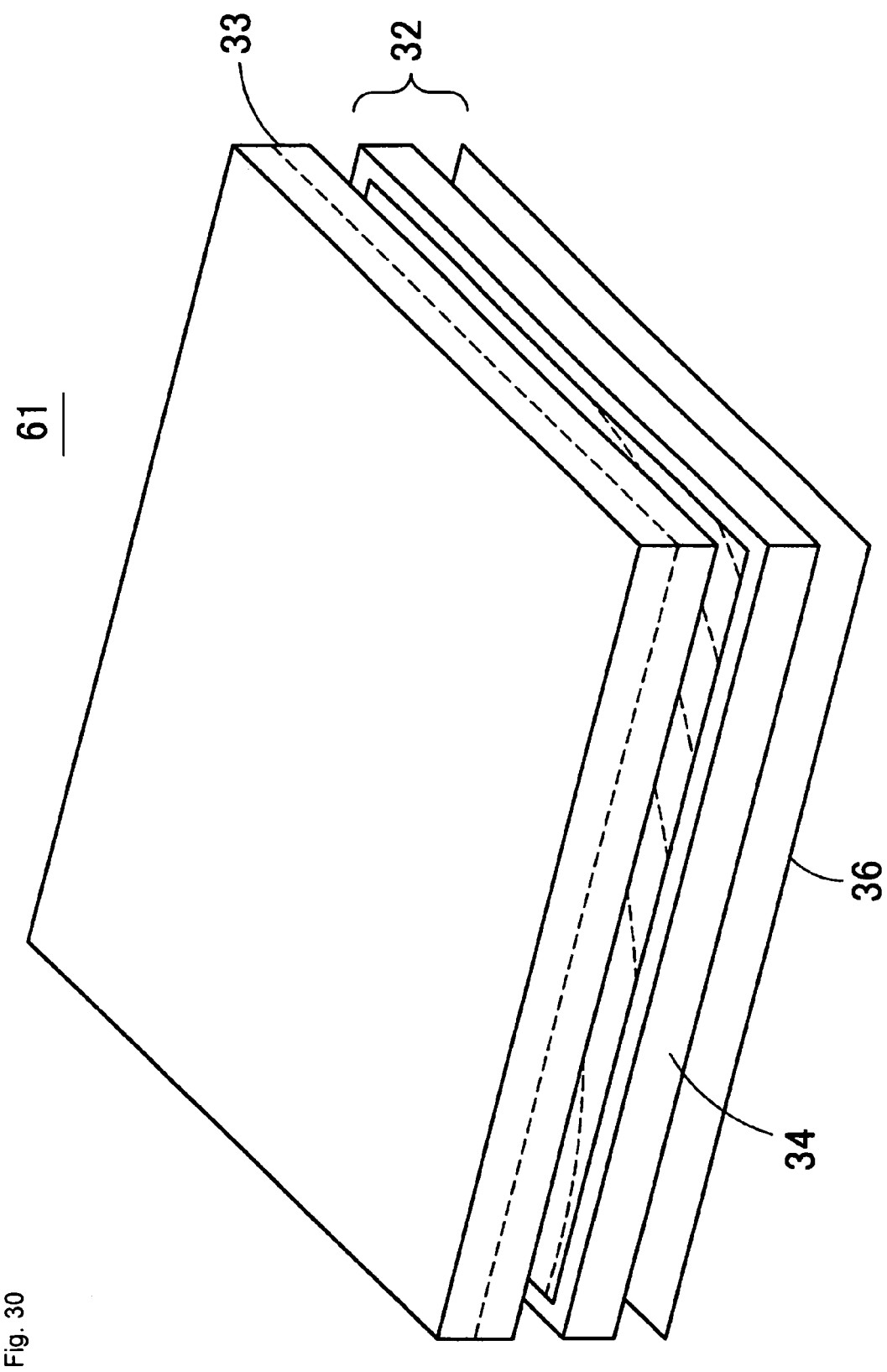
FIG. 30 shows a perspective view of a liquid crystal display according to a fifth embodiment of the present invention.
Figure 31:
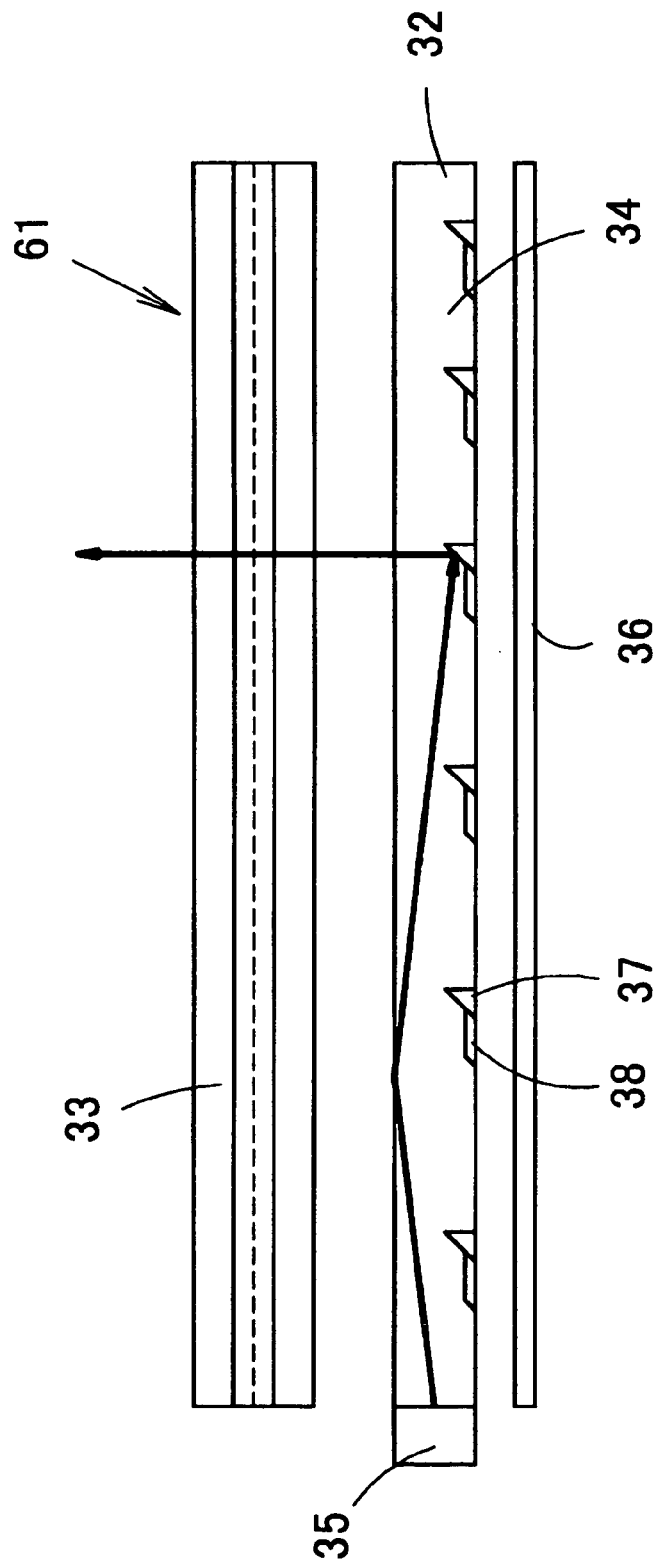
FIG. 31 shows a schematic sectional view of the liquid crystal display according to a fifth embodiment.

FIG. 30 shows a perspective view of a liquid crystal display 61 provided with a surface light source device 32 according to a fifth embodiment of the present invention. FIG. 31 shows a schematic sectional view of the aforementioned liquid crystal display 61. That is, a liquid crystal panel 33 is arranged in front of the surface light source device 32. In such the liquid crystal display 61, the liquid crystal panel 33 can be vertically illuminated from the backside by the surface light source device 32 without using a prism panel or the like. Then, the bright line is not generated in the liquid crystal display 61 and image visibility is improved by using the surface light source device 32 according to the present invention. In addition, there is not a possibility to damage the diffusion pattern 38 by external force and shock.

Figure 32:
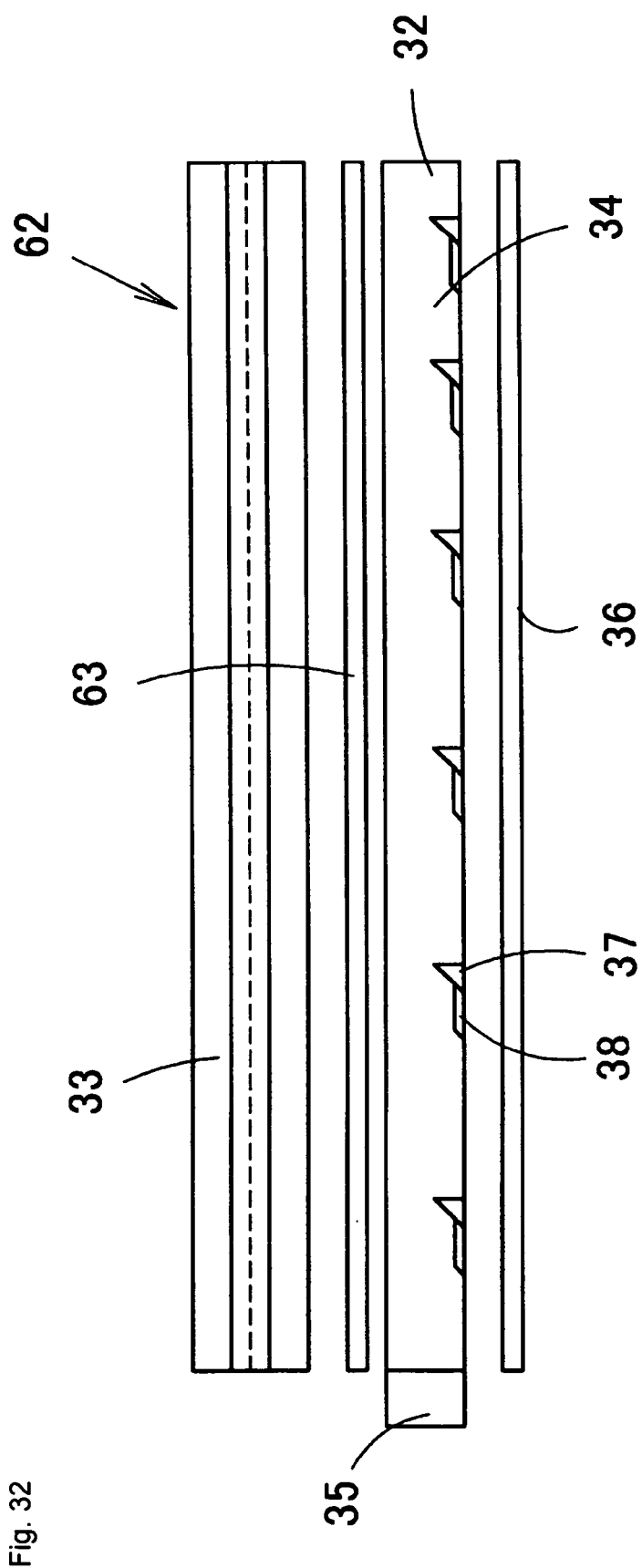
FIG. 32 shows a schematic sectional view of a surface light source device provided with a diffusion plate between the surface light source device and the liquid crystal panel.

In addition, a diffusion plate 63 may be sandwiched between the surface light source device 32 and the liquid crystal panel 33 as shown in FIG. 32, if needed.

Figure 33:
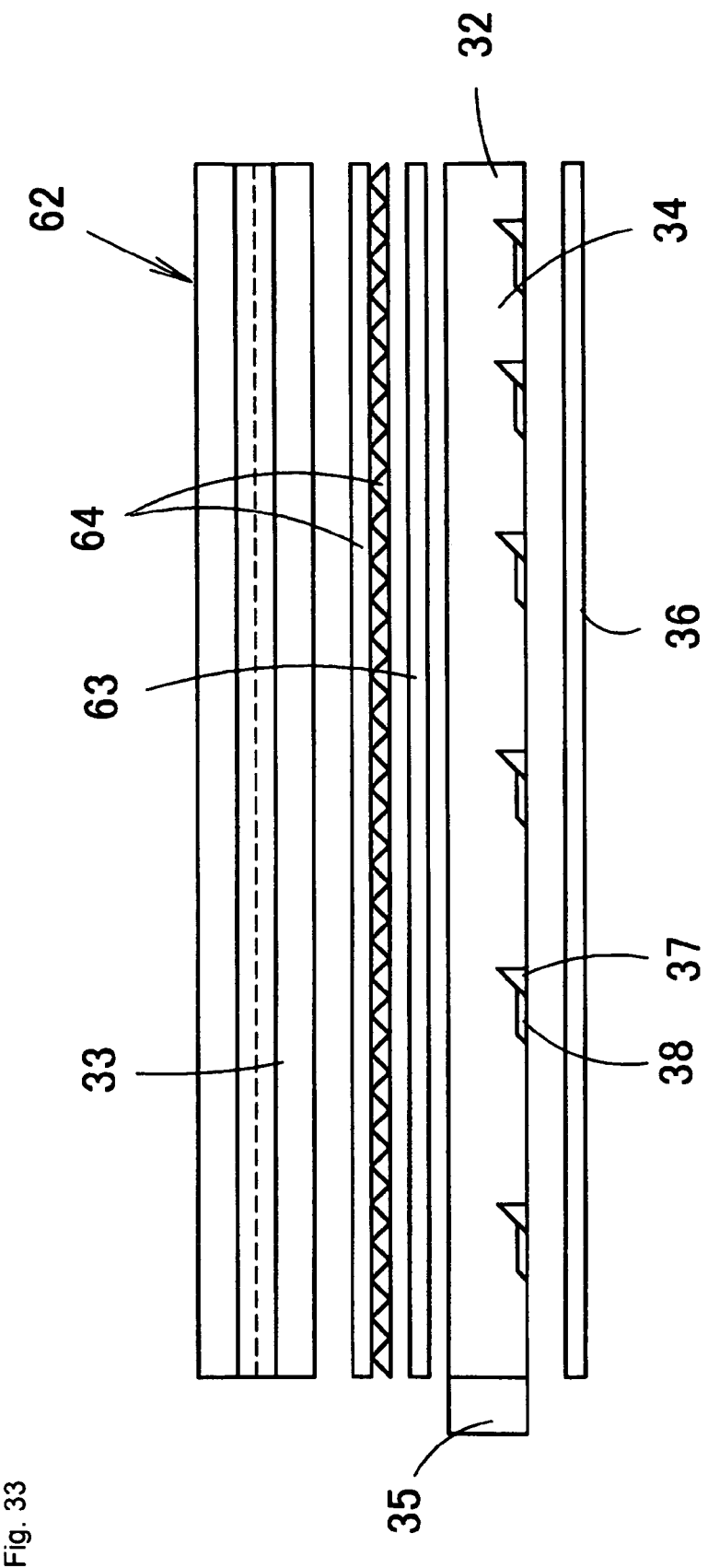
FIG. 33 shows a schematic sectional view of a surface light source device provided with a prism sheet between the surface light source device and the liquid crystal panel.

Furthermore, when the light outputted from the light emitting plane 39 has a large inclination from a direction perpendicular to the light emitting plane 39, as shown in FIG. 33, the outgoing light may be steered to the vertical direction by sandwiching a prism sheet 64 between the surface light source device 32 and the liquid crystal panel 33.

Although not shown in the drawing, as a liquid crystal display, it is not limited to a back light type in which the liquid crystal panel is illuminated from a side (the backside side) opposite to an observer; however, a front light type in which the liquid crystal panel is illuminated from an observer side (the front side) may be used. Furthermore, a reversible light in which the image can be observed from both sides by means of one sheet of the surface light source device and one sheet of the liquid crystal panel may be used.

Figure 34:
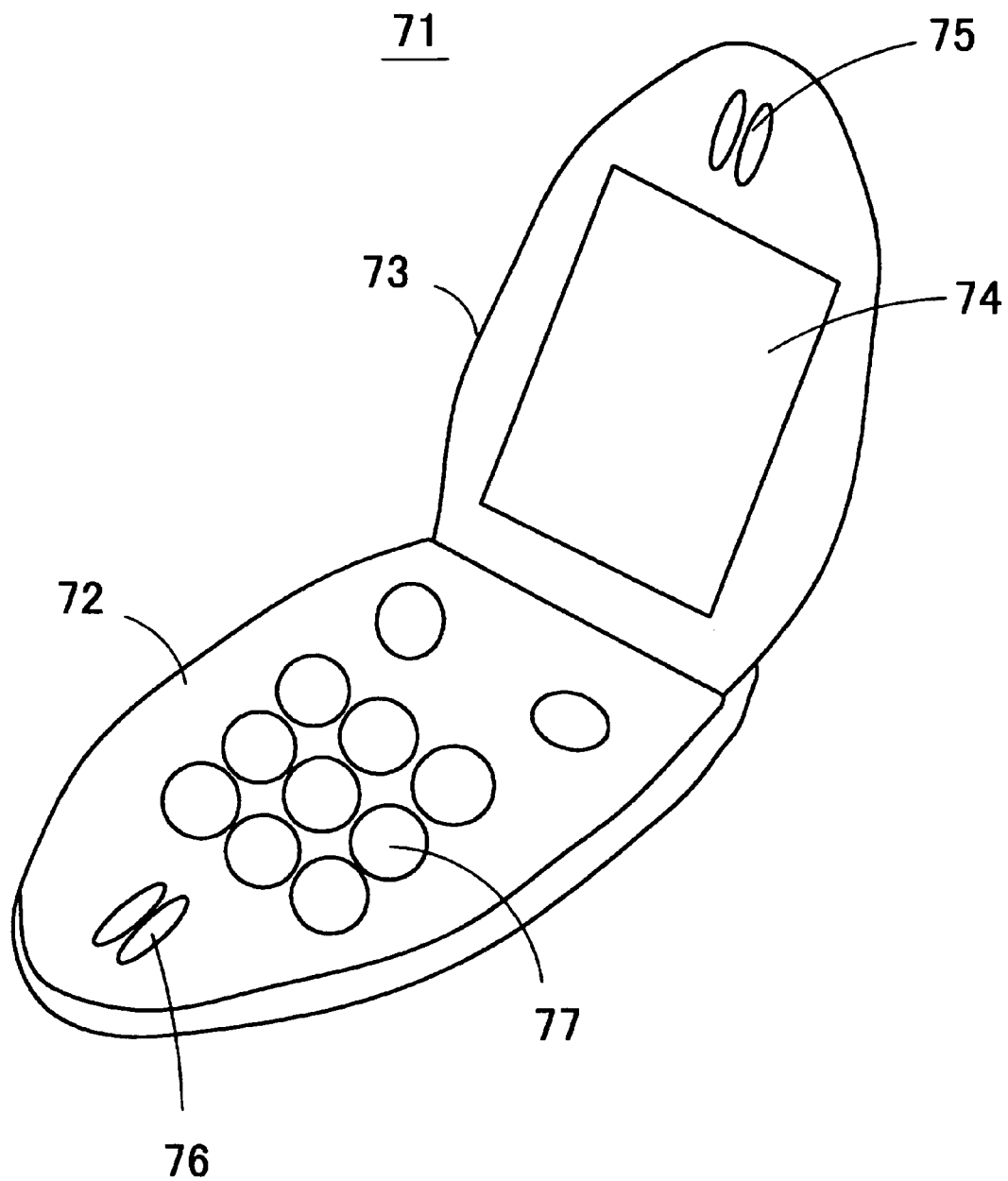
FIG. 34 shows a view of a mobile telephone according to a sixth embodiment of the present invention.

FIG. 34 shows a view of an example of use of a liquid crystal display according to one aspect of the present invention. FIG. 34 shows a flip mobile telephone 71. The mobile telephone 71 is composed of an operation unit 72 and a display unit 73. The operation unit 72 includes an operation key 77 such as a numeric keypad or the like and a microphone 76. The display unit 73 includes a liquid crystal display 74 and a speaker 75. The light source can be incorporated so as to be placed at any direction in the liquid crystal display 74. Furthermore, the liquid crystal display 74 may be a double-side display type. The mobile telephone 71 can be easily watched because of no generation of the bright line.

Furthermore, as applicable examples, it is not limited to a mobile telephone; however it can be made for wide scale use in personal digital assistant (referred to as PDA), digital still cameras, game appliances, and the like.

What is claimed is:

1. A surface light source device comprising:
   a light guide plate having a light emitting plane at one end; and
   a light source arranged at a corner portion or side of the light guide plate, wherein
   a plurality of deflection patterns is formed on a first region in a plane opposite to the light emitting plane;
   the deflection pattern outputs light from the light emitting plane by reflecting the light guiding in the light guide plate;
   a diffusion pattern is formed on a second region that does not overlap the first region in the plane opposite the light emitting plane on the light source side of the deflection pattern;

the deflection pattern and the diffusion pattern are formed so as not to protrude outside the light guide plate from the plane opposite to the light emitting plane; and the diffusion pattern diffuses the light incident from a light guide direction to a direction different from the light guide direction seen from a direction perpendicular to the light emitting plane.

2. A surface light source device according to claim 1, wherein the diffusion pattern is formed by at least one of convex pattern, concave pattern and corrugated pattern.

3. A surface light source device according to claim 2, wherein the diffusion pattern is a triangular wave shape in cross section in which an isosceles triangle pattern continues in a plane perpendicular to the light guide direction and has a uniform cross section in the light guide direction.

4. A surface light source device according to claim 3, wherein an end placed on the light source side of the diffusion pattern is a shape in which a substantially semi cone shaped pattern is disposed along a direction perpendicular to the light guide direction.

5. A surface light source device according to claim 2, wherein the diffusion pattern is a waveform shape in cross section in a plane perpendicular to the light guide direction and has a uniform cross section in the light guide direction; and a pitch of the waveform in cross section perpendicular to the light guide direction is random.

6. A surface light source device according to claim 5, wherein a pitch in cross section in a plane perpendicular to the light guide direction of the diffusion pattern has the minimum value which is not less than 1.5 μm and the maximum value which is not less than twice the minimum value; and the diffusion pattern of each pitch in between the minimum value and the maximum value is provided at substantially the same frequency.

7. A surface light source device according to claim 5, wherein an end placed on the light source side of the diffusion pattern is a shape in which a substantially semi cone shaped pattern is disposed along a direction perpendicular to the light guide direction.

8. A surface light source device according to claim 2, wherein the diffusion pattern is constituted by a plurality of patterns, each having a hemispheric shape or a semi-elliptical spherical shape.

9. A surface light source device according to claim 2, wherein the diffusion pattern is constituted by a plurality of patterns, each having a cone shape, an elliptical cone shape, or a pyramid shape.

10. A surface light source device according to claim 1, wherein the maximum height Rmax of the diffusion pattern is satisfied as follows: $0.2 \mu m \leqq Rmax \leqq 0.5 \times H$, where Rmax is the maximum height of the diffusion pattern measured from the plane opposite to the light emitting plane of the light guide plate; and H is a vertical height of the deflection pattern measured from the plane opposite to the light emitting plane of the light guide plate.

11. A surface light source device according to claim 1, wherein a length in the light guide direction of the diffusion pattern is not less than twice the length in the light guide direction of an inclined plane which makes the light at the deflection pattern perform total reflection.

12. A surface light source device according to claim 1, wherein a fine corrugated shape is formed along a ridge line placed at the uppermost portion of the deflection pattern.

13. A surface light source comprising:
a light guide plate having a light emitting plane at one end; and
a light source arranged at a corner portion or side of the light guide plate, wherein
a plurality of deflection patterns is formed on a plane opposite to the light emitting plane;
the deflection pattern outputs light from the light emitting plane by reflecting the light guiding in the light guide plate;
a diffusion pattern is formed on the light source side of the deflection pattern;
the deflection pattern and the diffusion pattern are formed so as not to protrude outside the light guide plate from the plane opposite to the light emitting plane;
the diffusion pattern diffuses the light incident from a light guide direction to a direction different from the light guide direction seen from a direction perpendicular to the light emitting plane; and
a width extending perpendicular to the light guide direction of the diffusion pattern is wider than a width extending perpendicular to the light guide direction of the deflection pattern, when seen from a direction perpendicular to the light emitting plane.

14. A surface light source comprising:
a light guide plate having a light emitting plane at one end; and
a light source arranged at a corner portion or side of the light guide plate, wherein
a plurality of deflection patterns is formed on a plane opposite to the light emitting plane;
the deflection pattern outputs light from the light emitting plane by reflecting the light guiding in the light guide plate;
a diffusion pattern is formed on the light source side of the deflection pattern;
the deflection pattern and the diffusion pattern are formed so as not to protrude outside the light guide plate from the plane opposite to the light emitting plane;
the diffusion pattern diffuses the light incident from a light guide direction to a direction different from the light guide direction seen from a direction perpendicular to the light emitting plane;
the diffusion pattern is formed by at least one of convex pattern, concave pattern and corrugated pattern; and
the diffusion pattern is a sine wave shape in cross section in a plane perpendicular to the light guide direction and has a uniform cross section in the light guide direction.

15. A surface light source device according to claim 14, wherein an end placed on the light source side of the diffusion pattern is a shape in which a substantially semi cone shaped pattern is disposed along a direction perpendicular to the light guide direction.

* * * * *

UNITED STATES PATENT AND TRADEMARK OFFICE
CERTIFICATE OF CORRECTION

PATENT NO. : 7,455,443 B2
APPLICATION NO. : 11/491517
DATED : November 25, 2008
INVENTOR(S) : Kenji Sakurai et al.

It is certified that error appears in the above-identified patent and that said Letters Patent is hereby corrected as shown below:

On the Title Page:

On the cover page, section (75) Inventors, the second Inventor's last name "Ohhira" should be --Ohira--.

Signed and Sealed this

Twenty-seventh Day of January, 2009

JOHN DOLL
*Acting Director of the United States Patent and Trademark Office*